May 14, 1929.   H. L. COOKE   1,713,498
METHOD OF AND APPARATUS FOR DETERMINING SPACIAL
CONFIGURATION BY MEANS OF PHOTOGRAPHS
Filed Nov. 24, 1919   8 Sheets-Sheet 1

INVENTOR
H. L. Cooke
BY
ATTORNEY

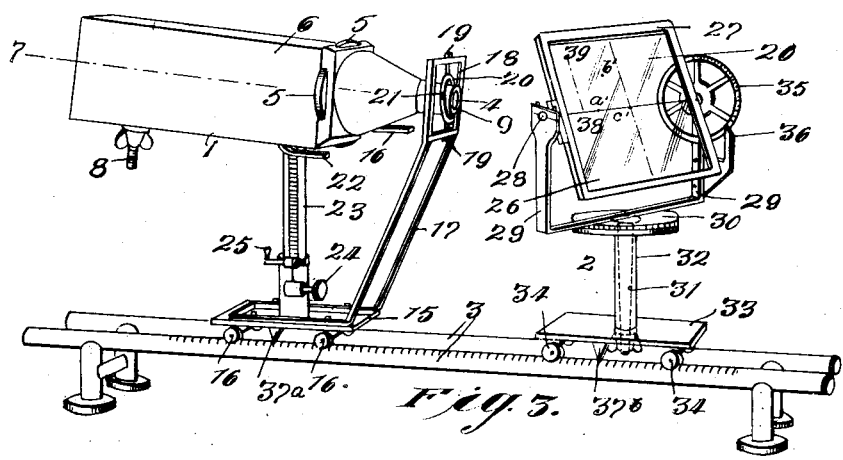

May 14, 1929. H. L. COOKE 1,713,498
METHOD OF AND APPARATUS FOR DETERMINING SPACIAL
CONFIGURATION BY MEANS OF PHOTOGRAPHS
Filed Nov. 24, 1919 8 Sheets-Sheet 4

INVENTOR
H. L. Cooke
BY
ATTORNEY

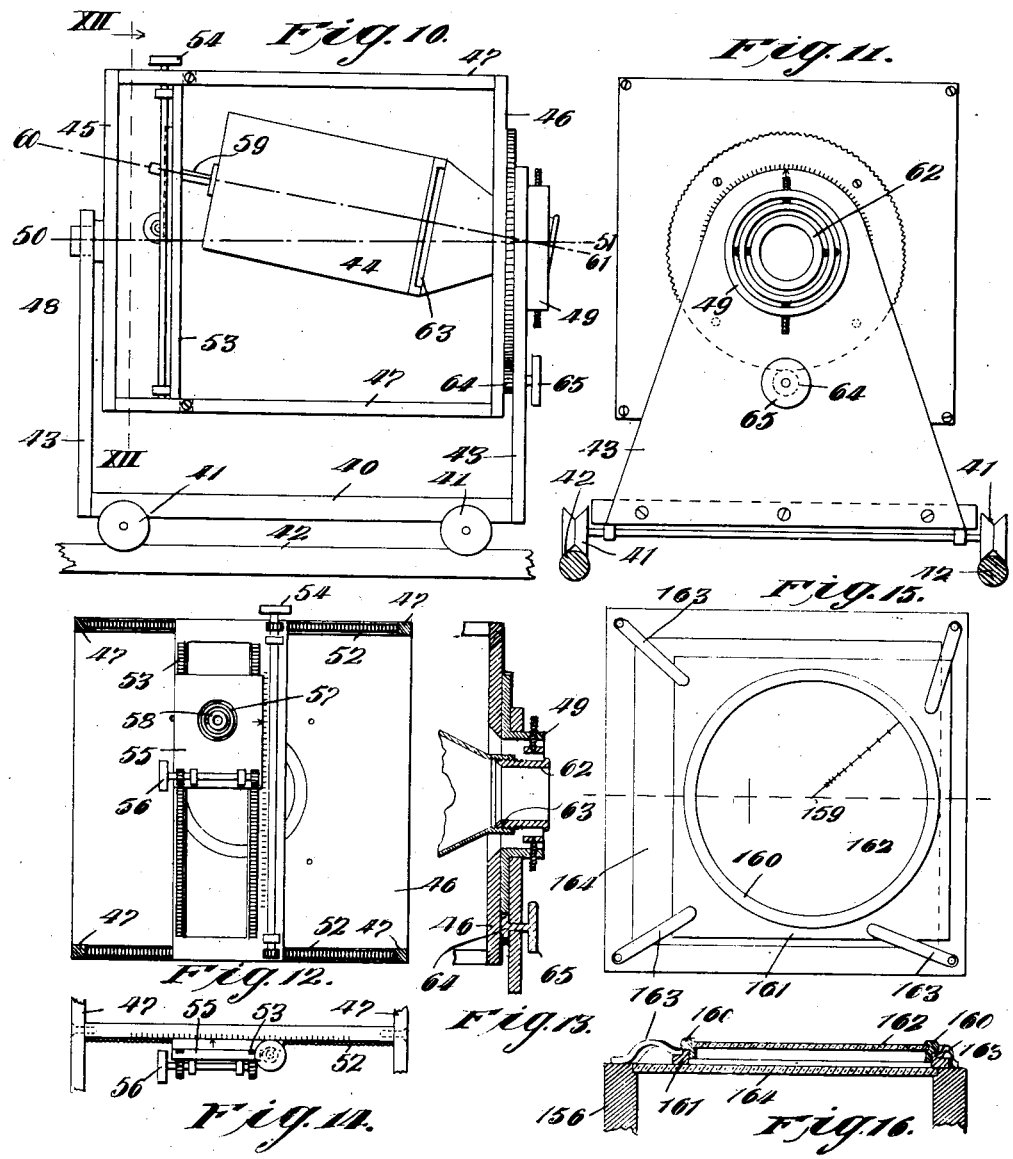

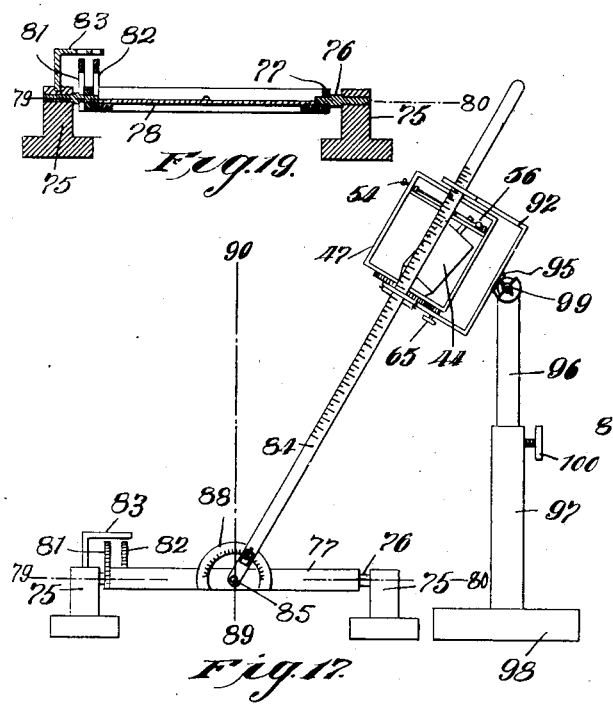

May 14, 1929.  H. L. COOKE  1,713,498
METHOD OF AND APPARATUS FOR DETERMINING SPACIAL
CONFIGURATION BY MEANS OF PHOTOGRAPHS
Filed Nov. 24, 1919   8 Sheets-Sheet 8
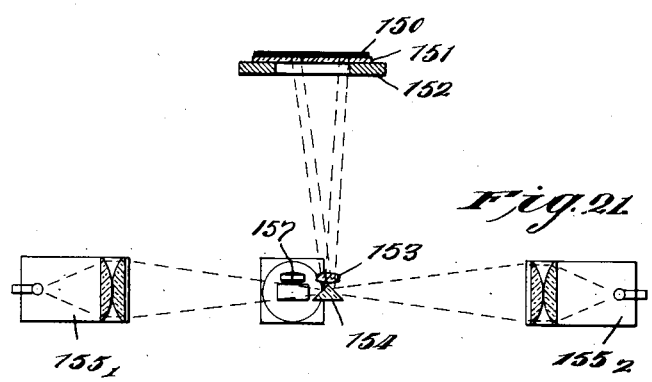
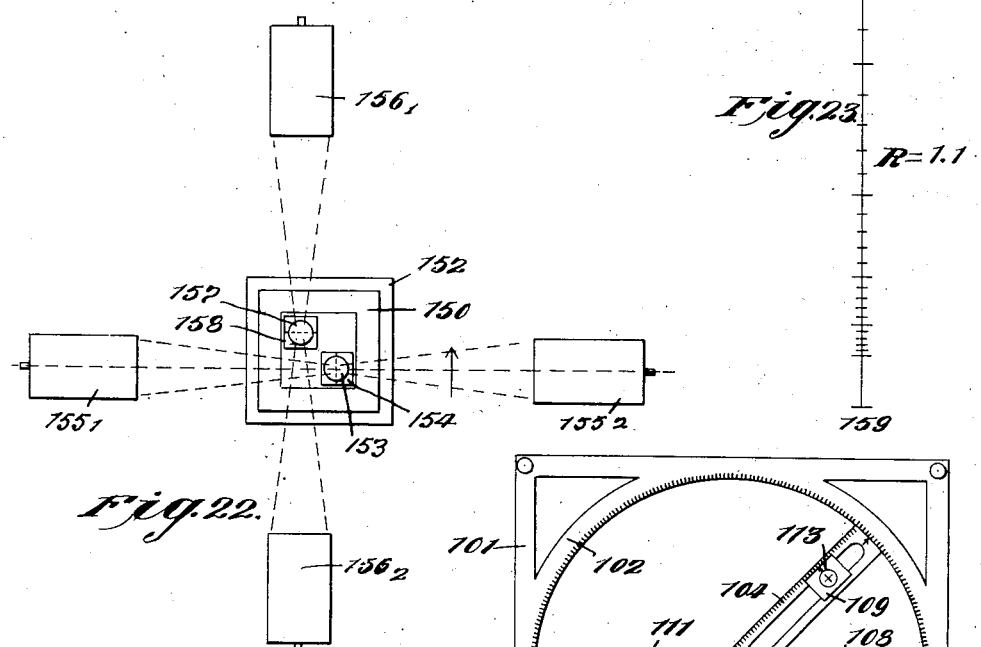
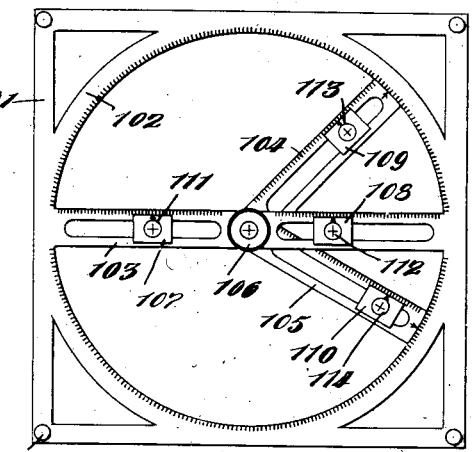
INVENTOR
H. L. Cooke
BY
ATTORNEY Patented May 14, 1929.

1,713,498

UNITED STATES PATENT OFFICE.

HEREWARD LESTER COOKE, OF PRINCETON, NEW JERSEY, ASSIGNOR TO AERO SURVEY CORP., A CORPORATION OF DELAWARE.

METHOD OF AND APPARATUS FOR DETERMINING SPACIAL CONFIGURATION BY MEANS OF PHOTOGRAPHS.

Application filed November 24, 1919. Serial No. 340,231.

This invention relates to the determination of the spacial configuration or position in space of objects by means of photographs and makes use of the fact that an object when photographed from different points will appear differently placed with respect to other objects (shown in the photographs). In practicing the invention photographs taken from different points are employed in pairs, each photograph of the pair showing the object or objects to be located or region to be mapped, and also showing certain points, the exact locations of which in space are known or may be ascertained in any known way. In taking the photographs the exact relative position of the sensitized surface and the camera lens must be known but the position of the camera in space need not be determined, as this can be ascertained from the known points shown in the photographs as hereinafter explained. It is not necessary that the photographs of a pair be taken from the same or similar distances from the objects photographed. By means of the procedures and calculations herein disclosed the exact location of any point or points common to any pair of photographs may be determined from the photographs.

This invention may be employed in any case in which the spacial configuration of objects is to be determined by means of photographs, and can be applied to photographs taken from the ground as well as to those taken from aircraft. The invention is especially useful, however, in preparing maps from data supplied by photographs taken from aircraft in flight, and in the description of the principles and operation of the invention it will be assumed that photographs taken from aircraft are being dealt with. The application of the method to other photographs will then be considered. As applied to map making, the method is best adapted to plane surveying and the curvature of the earth's surface is therefore not considered in the following specification. .The method is applicable to both vertical and oblique photographs and may be employed in mapping both mountainous and flat country.

In the accompanying drawings which form a part of this specification—

Figure 3 is a diagrammatic perspective view of one form of apparatus which may be utilized in carrying out the invention;

Figure 4 is a longitudinal sectional view of the projection camera shown in Figure 3;

Figure 1:
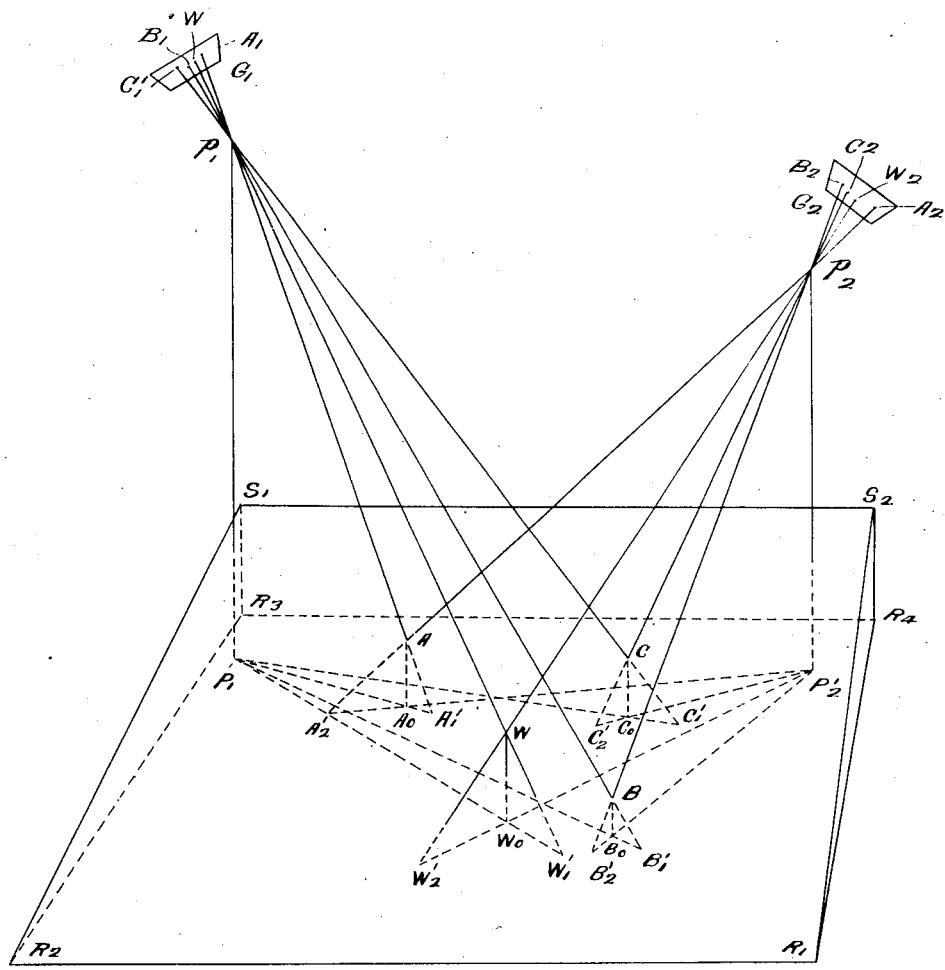
Figure 1 is a perspective diagram, showing positions of the camera pinhole or lens from which two photographs may be supposed to be taken, the corresponding positions of the camera plates, and the positions of four objects in nature which are included in both photographs.

Figures 5 to 9 inclusive are geometrical construction diagrams showing how the equations used in calculating the data for practicing the invention in accordance with the preferred methods are derived;

Figure 10 is a diagrammatic side elevation showing a modified form of adjustable supporting means for the projection camera, which may be utilized in practicing the invention;

Figure 11 is a front view of the same;

Figure 12 is a transverse vertical sectional view taken on line XII—XII of Figure 10;

Figure 13 is a longitudinal sectional view through the front part of the camera, the lens mount and the supporting means therefor;

Figure 14 is a fragmentary plan view showing the adjusting means for supporting the rear of the camera;

Figures 15 and 16 are respectively an end view and a transverse section showing an adjustable scale-plate and means for supporting the same in the focal plane of a projection camera;

Figure 17 is a diagrammatic side elevation of a modified form of apparatus which may be used in practicing the invention;

Figure 18 is a plan view of the apparatus shown in Figure 17, parts being omitted;

Figure 19 is a vertical sectional view of the screen and its supports, forming a part of the apparatus shown in Figures 17 and 18;

Figure 20 is a diagram illustrating the use of the adjustable scale plate shown in Figures 15 and 16, when employed in connection with the apparatus shown in Figures 21 and 22;

Figure 21 is a diagrammatic vertical sectional view of a projection apparatus which may be used for the rapid determination of the positions of points to be located by means of plane-of-reference projections produced in accordance with the present invention;

Figure 22 is a diagrammatic plan view of the apparatus shown in Figure 21;

Figure 23 is a diagram showing an antilogarithmic scale such as is used on the adjustable scale plate shown in Figures 15 and 16 in connection with the apparatus shown in Figures 21 and 22;

Figure 24 is a plan view of a form of plotting screen which may be employed for plotting control triangles in connection with the present invention.

The geometrical principles involved in the invention may be most easily understood by considering a hypothetical procedure through which the photographs may be supposed to be taken to obtain the necessary information for the preparation of maps. After the general principles have been explained in this way, certain practical methods of applying these principles will be described.

Throughout the description of this hypothetical procedure it will be assumed that the photographs are taken and projected by means of a pinhole instead of a lens, and that all the camera projections concerned in this hypothetical procedure are true central (conical) projections. By means of these assumptions the explanation of the hypothetical procedure will be considerably simplified.

In this specification the terms "project" and "projection" will be taken to refer to orthogonal projections, unless the contrary is specially indicated. Central (conical) projections will be specifically referred to as such.

In Figure 1, let $P_1$ and $P_2$ represent the two positions of the camera pinhole, from which photographs have been taken, $G_1$ and $G_2$ the corresponding position of the plates, and let A B C and W be the positions of four objects in nature which are included in both photographs. The points $P_1$ and $P_2$ may be designated "points of sight" or "centers of projection". Let $R_1$ $R_2$ $R_3$ $R_4$ represent a horizontal plane of reference, say sea level, and let $R_1$ $R_2$ $S_1$ $S_2$ represent the plane determined by and containing the three points A B C of which the map positions $A_0$ $B_0$ $C_0$ and heights $A_0A$, $B_0B$, $C_0C$ above sea level may be regarded as known. Given the foregoing data concerning points A B C the essential problem of mapping by air photography is to determine the map position $W_0$ and height $W_0W$ above the plane of reference of an object such as W which does not necessarily lie in the same plane as the points A B and C.

Let $A_1$ $B_1$ $C_1$ and $W_1$ represent the photographic images of the points A B C and W on the plate $G_1$ and $A_2$ $B_2$ $C_2$ and $W_2$ the corresponding photographic images on the plate $G_2$. Produce the rays $A_1A$ $B_1B$ $C_1C$ $W_1W$ to meet the horizontal plane of reference $R_1$ $R_2$ $R_3$ $R_4$ in the points $A_1'$ $B_1'$ $C_1'$ $W_1'$ and similarly produce the rays $A_2A$ $B_2B$ $C_2C$ $W_2W$ to meet this plane in the points $A_2'$ $B_2'$ $C_2'$ and $W_2'$. From $P_1$ and $P_2$ let fall perpendiculars on the plane of reference, meeting this plane in the points $P_1'$ and $P_2'$ which may be designated "centers of vision" or "station points". Join the point $P_1'$ to the points $A_1'$ $B_1'$ $C_1'$ and $W_1'$, and the point $P_2'$ to the points $A_2'$ $B_2'$ $C_2'$ and $W_2'$. Since the line $P_1'$ $W_1'$ is the projection of the line $P_1$ $W_1'$ on the plane of reference, and the line $P_2'$ $W_2'$ is the corresponding projection of the line $P_2$ $W_2'$ it follows that the intersection $W_0$ of the lines $P_1'$ $W_1'$ and $P_2'$ $W_2'$ is the projection of the point W (the intersection of the lines $P_1$ $W_1'$ and $P_2$ $W_2'$) on the plane of reference, i. e., $W_0$ is the map position of W. It is also evident that the height $W_0W$ (the height of W from the plane of reference) may be found by measuring the distance $W_0W_1'$, and multiplying this by the tangent of the angle $P_1W_1'P_1'$ (the ratio of the length $P_1'$ $P_1$ to the length $P_1'$ $W_1'$) or by multiplying the length $W_0W_2'$ by the tangent of the angle $P_2W_2'P_2'$ (the ratio of $P_2'$ $P_2$ to $P_2'$ $W_2'$).

It appears from the foregoing that if a method can be found of determining for any pair of photographs the positions corresponding to $P_1$ and $P_1'$, $P_2$ and $P_2'$, and of obtaining central projections of these photographs corresponding to the proportions having the configuration $A_1'$ $B_1'$ $C_1'$ $W_1'$ and $A_2'$ $B_2'$ $C_2'$ $W_2'$, the map position and height of any object such as W included in both photographs may be determined.

Figure 2:
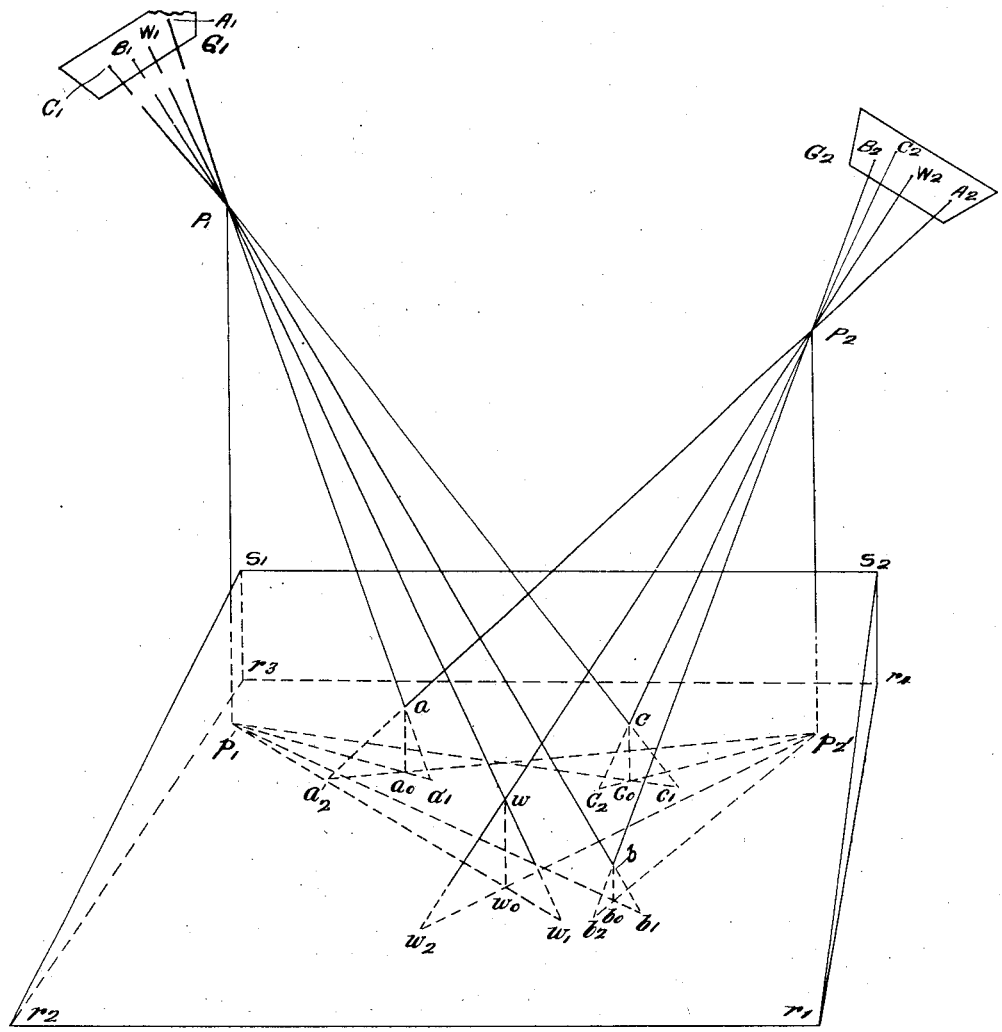
Figure 2 is a similar diagram of certain arrangements to be effected in the drafting room when the photographs are being employed for the purpose of preparing the map.

To proceed with the description of the hypothetical method of employing the photographs, let Figure 2 represent a perspective diagram of certain arrangements to be effected in the drafting room when the photographs are being employed for the purpose of preparing the map.

On a white flat screen $r_1$ $r_2$ $S_1$ $S_2$ a triangle $a\ b\ c$ is plotted which is an exact reproduction of the triangle A B C, Figure 1, in its own plane $R_1$ $R_2$ $S_1$ $S_2$ reduced to some convenient scale, say 1/N times the scale of nature. This screen $r_1$ $r_2$ $S_1$ $S_2$ is mounted above the white flat horizontal surface of a table $r_1$ $r_2$ $r_3$ $r_4$ in such a manner that the vertical distances of the plotted points $a\ b\ c$ above the surface $r_1$ $r_2$ $r_3$ $r_4$ correspond exactly to the scale 1/N with the vertical distances of the points in nature, A B C above the plane of reference $R_1$ $R_2$ $R_3$ $R_4$. When this adjustment has been effected the positions of the points $a\ b\ c$ form an exact reproduction in space, to the scale 1/N, of the spacial configuration of the points A B C in nature.

One of the photographic plates $G_1$ is now mounted in a projection camera with the pinhole $p_1$ occupying the same position relative to the plate as at the time the photograph was taken. This projection camera is then mounted on an adjustable stand so that it may be moved and oriented into any position and rigidly retained thereby suitable mechanism.

The light in the projection camera is now turned on, and the camera is moved about until the projected images of the photographic images $A_1$ $B_1$ $C_1$ cast on the screen $r_1$ $r_2$ $S_1$ $S_2$ coincide with the plotted positions $a$ $b$ $c$ a correspondence between the projected images of $A_1$ $B_1$ $C_1$ and $a$ $b$ $c$ similar to that indicated in Figure 1 being of course effected. Such a fit between the images and the plotted points will be attained when the pinhole position $p_1$ relative to the plotted triangle $a$ $b$ $c$ is similar to the position of the pinhole $P_1$, Figure 1, relative to the points A B C in nature. This is evident from the fact that the pinhole and plate in the projection camera occupy the same relative position as the pinhole and plate in the camera with which the photograph was taken, and hence the trihedral angle formed by the emergent rays $p_1a$, $p_1b$, $p_1c$ as edges Figure 2 must be identical with the trihedral angle formed by the incident rays A $P_1$ B $P_1$ C $P_1$ as edges Figure 1. It follows then, since the triangle $a$ $b$ $c$ is similar to the triangle A B C that the oblique tetrahedron $a$ $b$ $c$ $p_1$ is similar to the oblique tetrahedron A B C $P_1$ so that the position of $p_1$ relative to the triangle $a$ $b$ $c$ is similar to the position of $P_1$ relative to the triangle A B C. (The scale of the arrangement in Figure 2 below the points $p_1$ and $p_2$ is of course 1/N times the scale of nature shown in the corresponding part of Figure 1.) When this adjustment of the projection camera has been effected, the camera is rigidly clamped in position and retained there during the remainder of the operations.

It is to be noted that there are in general several positions of the pinhole $p_1$ from which the projected images of the points $A_1$ $B_1$ $C_1$ may be made to coincide with the plotted triangle $a$ $b$ $c$ with the proper correspondence between points. There is therefore an apparent ambiguity in the method described of locating the point $P_1$. It has been found by actual experiment however that this ambiguity will occasion no serious trouble in locating the proper position of $P_1$ provided the conical angle subtended by the three points A B C, Figure 1, viewed from the point $P_1$, is reasonably large, and provided that the point $P_1$, Figure 1, does not lie in the immediate neighborhood of any of the three perpendiculars erected on the points A B C normal to the plane $R_1$ $R_2$ $S_1$ $S_2$. A very little practice in the use of this method will enable the operator to detect at a glance when the projection is made from a wrong position of $p_1$, as the persective of the images projected from any of the wrong positions is distorted in an absurd manner which is apparent from a very casual inspection.

The plate $G_2$ is now mounted in a second projection camera, similar to the one employed with the plate $G_1$, and with the pinhole $p_2$ in the proper position relative to the plate $G_2$ as specified in the case of the pinhole $p_1$ and plate $G_1$. This second projection camera is then moved around until the proper position of the pinhole $p_2$ is arrived at, as indicated by a coincidence of the projected images of the photographic images $A_2$ $B_2$ $C_2$ with the plotted points $a$ $b$ $c$ on the screen $r_1$ $r_2$ $S_1$ $S_2$, the difficulty in the ambiguity of the position of $p_2$ being overcome as described above. This second projection camera is then clamped rigidly in position, and maintained thus during the remainder of the operations.

The screen $r_1$ $r_2$ $S_1$ $S_2$ is now removed, the two projection cameras being left in position. The projection camera on the left, Figure 2 is then turned on, and the images of the photographis images $A_1$ $B_1$ $C_1$ $W_1$ centrally projected on the horizontal surface of the table $r_1$ $r_2$ $r_3$ $r_4$ will then occupy the positions $a_1'$ $b_1'$ $c_1'$ corresponding with the configuration of the points $A_1'$ $B_1'$ $C_1'$ Figure 1, on the reduced scale 1/N times that of nature. The projected image of the object W, Figure 1, will be found at the point $w_1'$, corresponding on the scale 1/N with the position $W_1'$ Figure 1. The positions of these points $a_1'$ $b_1'$ $c_1'$ $w_1'$ are marked, the position of $p_1'$, the projection of the pinhole position $p_1$ on the plane of the table located by means of a plumb bob let fall from $p_1$, and the height $p_1'$ $p_1$ measured. The points $a_1'$ $b_1'$ $c_1'$ $w_1'$ are then joined to the point $p_1'$ by straight lines, drawn on the table.

The light in the projection camera on the left is now turned off, the light in the projection camera on the right turned on, and the positions of the points $a_2'$ $b_2'$ $c_2'$ $w_2'$ Figure 2, corresponding to the points $A_2'$ $B_2'$ $C_2'$ $W_2'$ Figure 1, the position of the point $p_2'$, the projection of the point $p_2$ on the plane of the table, and the height $p_2'$ $p_2$ determined in a manner similar to that of determining the points $a_1'$ $b_1'$ $c_1'$ $p_1'$ and $p_1$ as already described. Straight lines are then drawn from $p_2'$ to $a_2'$ $b_2'$ $c_2'$ and $w_2'$.

The intersections of the lines $p_1'$ $a_1'$ and $p_2'$ $a_2'$ $p_1'$ $b_1'$ and $p_2'$ $b_2'$ $p_1'$ $c_1'$ and $p_2'$ $c_2'$ will then determine the map positions $A_0$ $B_0$ $C_0$ of the points $A_1$ $B_1$ $C_1$ Figure 1, to the scale of 1/N. The map position, to the same scale, of W will evidently be at the intersection $w_0$ of the lines $p_1'$ $w_1'$ and $p_2'$ $w_2'$, or these lines produced when W is below the plane of reference and the height $W_0 W$, to the same scale, is found by multiplying the measured distance $w_0$ $w_1'$ by the tangent of the angle $p_1$ $w_1'$ $p_1'$ or by multiplying the measured distance $w_0$ $w_2'$ by the tangent of the angle $p_2$ $w_2'$ $p_2'$. Thus the position in space of the object W relative to the points A B and C Figure 1 is completely fixed. The positions in space of all other objects which appear in both photographs may be similarly located, and the region around the triangle A B C mapped by this method.

It is to be noted that if the image of an object in the plane-of-reference projection lies between the map position of the object and the centre of vision (station point) of the projection, the object lies below the plane of reference. Its distance from the plane of reference is calculated as before by multiplying the distance of the image from the map position by the height of the point of sight from the plane of reference, and dividing by the distance of the image from the centre of vision.

Although it is theoretically possible to carry out the foregoing procedure, in actual practice the difficulties would be found to be very great, as it would be a very slow and tedious process to adjust the two projection cameras accurately to the correct positions as shown in Figure 2. Special apparatus has therefore been designed for carrying out a process equivalent to the hypothetical procedure described, in which the adjustments may be accomplished with ease and certainty. A description of one form of this apparatus will now be given.

It is now assumed that the photographs to be dealt with are taken and projected with lenses, and not with pinholes.

The apparatus is shown in perspective in Figure 3. There are three main parts, the projection camera and mounting 1, shown on the left, the projection screen and mounting 2, on the right, and two horizontal parallel rails 3, shown in the lower part of the figure, upon which two carriages supporting the projection camera and screen may be moved backwards and forwards parallel to the rails 3.

The lens of the projection camera is placed at 4, the plate holder at 5, the condensing lens is within the body of the camera behind the plate holder at 6, and the source of illumination is supported centrally on the main camera axis 4—7 by the mount 8. These four parts are all carried by the rigid framework of the camera.

The lens 4, preferably of the same type as that employed in the aircraft in taking the photographs, is mounted with its axis in a position relative to the plate $G_1$ identical with the position of the line of the axis of the photographic lens relative to the plate $G_1$ at the time the plate $G_1$ was exposed, and in the usual case coinciding with the axis 4—7. It is carried in a focusing screw mount 9 (Figure 4) so that the distance between the lens and the plate carried in the plate holder may be adjusted by moving the plate towards and from the lens. The plate holder 5 is in the form of a circular ring and is mounted in the framework of the camera in such a manner that it may be rotated about the camera axis 4—7, the plane of the plate remaining normal to this axis during this rotation. As shown in Figure 4 the rear part of the lens mount is externally threaded and slidingly fitted upon the tubular portion 10 at the front of the camera. An internally threaded adjusting ring 11 is mounted to rotate freely on the tubular portion 10 and has a screw-threaded engagement with the lens mount 9. By rotating the ring 11 the entire camera and with it the plate holder and plate may be adjusted with respect to the lens mount which is supported by the gimbals described below. The condensing lens is rigidly mounted within the body of the camera, with its axis coinciding with the axis 4—7. The mount 8 for the source of illumination is adjustable, so that the source of illumination may be moved backwards and forwards along the axis 4—7, for the purpose of securing even illumination of the projected image.

The projection camera is supported on a carriage 15 fitted with wheels 16 which enable it to be shifted backwards and forwards along the rails 3. A rigid metal framework 17 clamped to the carriage 15, terminates at its upper extremity in a square framework 18. Two screw gimbal pins 19, pass through this square framework and terminate in conical bearings in the gimbal ring 20. Two screw gimbal pins 21 (the far one not shown) pass through the gimbal ring 20 and terminate in conical bearings in the mount 9 of the lens 4. The axes of the two gimbal bearings coincide in the axis of the lens 4 in the position of the external principal point of the lens, the female portion of the bearings of the gimbal pins 21 being drilled in the lens mount in such a position as to secure this adjustment.

It is shown in treatises on geometrical optics that there are two points, called principal points, on the axis of a lens, such that if a straight line be drawn from an object on one side of the lens to one of these principal points, and a second line be drawn, parallel to the first line, through the second principal point, this second line will pass through the position of the image of the object from which the first line was drawn. In this specification the principal point to which rays external to the camera are drawn in this method of locating the image will be called the "external principal point", the other principal point being called the "internal principal point". This convention will be adhered to whether the camera be a photographic or a projection camera.

The main weight of the projection camera rests on a metal rail 22 bent into the arc of a horizontal circle having its centre on the vertical line through the axes of the gimbal pins 19. This bent rail 22 is rigidly attached to the vertical metal rod 23 which may be raised and lowered by a rack and pinion mechanism operated by the milled head 24. The screw clamp 25 enables any vertical adjustment of the rod 23 to be rigidly maintained.

As the rod 23 is raised and lowered the projection camera will swing about a horizontal axis coinciding with the axis of the gimbals 21. This axis will be referred to as the horizontal axis of the projection camera. As the camera is slid sideways in either direction along the bent rail 22 it will swing about a vertical axis passing through the gimbals 19. This axis will be referred to as the vertical axis of the projection camera. As the plate holder 5 is rotated the plate and the projected image of the plate will rotate about the main axis 4—7 of the projection camera, this axis being normal to the plate and passing through the intersection of the horizontal and vertical axes of the projection camera. As the carriage 15 is slid backwards and forwards along the rails 3 the camera will experience a motion of pure translation parallel to the rails 3. It is seen therefore that this mounting of the projection camera enables the axis of the camera to be pointed in any direction within wide limits, the plate and projected image to be oriented in any manner about this direction as an axis, and the camera to be brought into any position, subject only to the constraint that the external principal point of the lens remains coincident with a horizontal line passing through the intersection of the vertical and horizontal axes of the projection camera, this line being parallel to the axes of the rails 3. This is equivalent to mounting the camera so that it may be rotated about three independent axes coinciding in a principal point of the lens, and also so that it may experience displacements of pure linear translation parallel to a given line.

Passing now to the screen and mount 2, shown on the right in Figure 3, this consists of a flat surface 26, preferably of glass with a ground glass surface on the side facing the projection camera, so that the image cast by the camera on the screen may be viewed through the glass from the side of the screen remote from the camera. The screen 26 is held securely in a frame 27, which is supported by trunnions 28 (the far one not shown) resting in bearing grooves in the framework 29. The axis of these trunnion bearings is arranged so as to be at exactly the same height above the rails 3 as the intersection of the horizontal and vertical axes of the projection camera at 4. This trunnion mounting enables the screen 26 to be rotated about a horizontal axis coinciding with the trunnion axis. This axis will be referred to as the horizontal axis of the screen. The framework 29 is rigidly clamped to the circular table 30, which is capable of rotation about a vertical axis by means of a conical bearing 31 passing down centrally through the body of the main support 32. This axis will be referred to as the vertical axis of the screen. This main support 32 is rigidly secured to the carriage 33, which is similar to the carriage 15, and runs on wheels 34 on the rails 3. The vertical and horizontal axes of rotation of the screen mounting are so arranged that they intersect in a point, the line joining the point of intersection to the point of intersection of the vertical and horizontal axes of the camera being parallel to the axes of the rails 3. The line joining these two points of intersection will be referred to as the axis of linear motion. The screen 26 is so placed that when its plane is vertical both the vertical and horizontal axes of the screen lie in the plane of the surface of the screen which faces the projection camera. The point of intersection of the axes in the plane of the screen will be called the screen centre. A member 35 having a circular scale engraved thereon is rigidly attached to the frame 27, and a pointer 36 cooperating with this scale is rigidly attached to the framework 29 so that the angular displacements of the screen 26 about the horizontal axis of the trunnions may be determined by the operator. Similarly, a circular scale on the circular table 30, co-operating with a pointer attached to the main support 32 enables the operator to determine the angular displacements of the screen 26 about the vertical axis. These two pointers and scales are so arranged that when the plane of the screen is normal to the axis of linear motion the reading on each scale is zero.

One of the rails 3 is graduated with a linear scale in some convenient unit, say millimeters, and pointers $37_a$ and $37_b$ attached to the carriages 15 and 33 respectively, cooperate with this scale. This scale may be arranged with increasing numbers running from left to right (away from the projection camera). A preliminary adjustment is carried out in which the carriage 15 is moved into such a position on the rails 3 that the reading of the pointer $37_b$ attached to the screen carriage 33 on the linear scale on the rail 3 indicates the horizontal distance from the intersection of the vertical and horizontal axes of the camera to the intersection of vertical and horizontal axes of the screen.

A method of employing the projection apparatus shown in Figure 3 will now be described. Suppose that the two photographs shown in Figure 1 have been taken, these two photographs including the control triangle A B C of which the positions and heights of the three points may be regarded as known, and the object W, whose position is to be determined. Let the photographic images of the points A B C on the plate $G_1$ exposed from the lens position $P_1$ be $A_1$ $B_1$ $C_1$, Figure 1 and let A be the highest and B the lowest point of the control triangle in nature, C being the point of intermediate height. On the screen 26, Figure 3, a triangle $a'$ $b'$ $c'$ is plotted, which is an exact reproduction to the scale 1/N previously referred to, of the control triangle A B C in nature in its own plane and is thus an exact reproduction of the triangle $a$ $b$ $c$, Figure 2. The dimensions of the triangle $a'$ $b'$ $c'$, may be determined from the map positions and elevations of the points A B and C in any suitable manner, for instance, by determining the lengths of the sides of the triangle by means of equations I given below. The point $c'$ corresponding to the point of intermediate height C in the control triangle in nature is plotted on the screen 26 at the screen centre and is therefore on the axis of linear motion. One of the other points of the plotted triangle $a'$ $b'$ $c'$, say $a'$, corresponding to the highest point A of the control triangle, is conveniently plotted on the same horizontal line as $c'$, the two points $a'$ and $c'$ thus lying on the horizontal axis of the screen 26. The third point $b'$ corresponding with the lowest point of the control triangle in nature is conveniently plotted above the line joining $a'$ and $c'$.

One of the photographs, say $G_1$, Figure 1, is now mounted in the plate holder 5, Figure 3, with the emulsion side towards the projection lens 4. This lens is of the same type as that used in exposing the plate $G_1$, but preferably of shorter focal length, this focal length being determined by the fact that the projected image must be brought to reasonably sharp focus on the screen 26 when the relative adjustment of screen and camera is such that the projected image of the control triangle may be made to fit the plotted triangle $a'$ $b'$ $c'$, and a reasonably large diaphragm is used in conjunction with the lens 4. The focusing screw mount of the projection lens 4 is now adjusted so that the relative position of the internal principal point of the lens is placed with respect to the plate $G_1$ in a manner identical with the corresponding arrangement of lens and plate at the time this plate was exposed.

The source of illumination in the projection camera is now turned on, and adjusted to a position giving even illumination of the image thrown on the screen. This image is examined, and the plate holder 5 rotated until the line joining the projected images of the photographic images $A_1$ and $C_1$, Figure 1, which are to be fitted to the plotted points $a'$ and $c'$ respectively, is horizontal with the projected image of $B_1$, Figure 1, which is to be fitted to the plotted point $b'$, above the line joining the images of $A_1$ and $C_1$. The milled head 24 is now operated, shifting the supporting rod 23 vertically until the line joining the images of $A_1$ and $C_1$ projected on the screen 26 coincides with the line joining $a'$ and $c'$, on the screen. The projection camera is now slid along the rail 22 until the projected image of $C_1$, Figure 1, coincides with the plotted position of $c'$ at the center of the screen. This is the final adjustment of the projection camera about its vertical and horizontal axes and the camera is left in this position during the remainder of the operations on the plate $G_1$.

It is obvious from the manner in which the apparatus is constructed and adjusted, that after the foregoing adjustments of the projection camera have been effected the projected image of the photographic image $C_1$ will remain coincident with the plotted point $c'$ and the projected image of the photographic image $A_1$ will remain on the horizontal line passing through the plotted points $a'$ and $c'$ no matter how the screen 26 may be moved about or oriented on its mounting.

The carriage is now moved into such a position that the projected image of the photographic image $A_1$, Figure 1 coincides with the plotted point $a'$. The screen is then rotated about its horizontal axis to ascertain if there is any orientation about this axis which will bring a coincidence between the projected image of $B_1$, and the plotted point $b'$ while the projected images of $A_1$ and $C_1$ remain coincident with $a'$ and $c'$. If no such orientation is found the screen is rotated through an angle about the vertical axis, the carriage 33, shifted to secure coincidence again between the image of $A_1$ and the plotted point $a'$, and another attempt made, by rotating the screen about the horizontal axis, to secure a simultaneous coincidence, of the projected images of $A_1$ $B_1$ $C_1$ with the plotted points $a'$ $b'$ $c'$. The trials are repeated in this manner until the proper coincidence has been attained. Experiment has shown that these operations can be effected with rapidity and certainty.

When these adjustments have been made the following four quantities are recorded:—

(1) The scale, relative to nature, to which the triangle $a$ $b$ $c$ is plotted.

(2) The reading of the pointer $37_b$ on the linear scale graduated on the rail 3, which fixes the distance from the point of intersection of the axis of rotation of the screen mount to the intersection of the axes of the camera.

(3) The reading on the circular scale on the table 30.

(4) The reading on the circular scale on the member 35.

By these four quantities and the coordinates in space of the three points of the control triangle A B C it is possible, as will be shown later, to calculate the positions of the points $P_1$ and $P_1'$, Figure 1.

The coordinates in space of the points $P_1$ $P_1'$ A B C Figure 1 being known, it is possible by the usual methods of solid geometry to calculate the positions of the points $A_1'$ $B_1'$ $C_1$, Figure 1.

When this has been done, the triangel $A_1'$ $B_1'$ $C_1'$ to the scale 1/N, is plotted on the screen 26 in the same way that the triangle $a'$ $b'$ $c'$ was plotted, $C_1'$ occupying the position $c'$, $A_1'$ being on the same horizontal line at $C_1'$ and $B_1'$ occupying the upper position. The screen mounting and carriages are then adjusted so that the projected images of $A_1$ $B_1$ $C_1$ cast on the screen, coincide with this new plotted triangle, the method of carrying out this operation being similar to that described for obtaining a coincidence with the triangle $a'$ $b'$ $c'$. The projection cast on the screen 26 after this operation has been effected will be termed the "plane-of-reference projection" of the plate $G_1$. A positive photographic reproduction of this plane-of-reference projection of the plate $G_1$ is now obtained my making an exposure on a photographic plate substituted for the screen 26, the adjustments of camera and screen holder remaining unaltered during the substitution of the photographic plate for the screen.

The plate $G_2$ is now put through a process precisely similar to that employed with the plate $G_1$, in which, by means of a coincidence between the projected images of the photographic images $A_2$ $B_2$ $C_2$, Figure 1, with the plotted triangel $a'$ $b'$ $c'$, Figure 3, data are supplied for the calculation of the positions of the points $P_2$ and $P_2'$, Figure 1: and subsequently a photographic positive of the plane-of-reference projection of the plate $G_2$, corresponding to the configuration $A_2'$ $B_2'$ $C_2'$ $W_2'$, Figure 1, is obtained, by a process similar to that employed in obtaining the photographic positive of the plane-of-reference projection of the plate $G_1$.

A flat surface on which the map is to be drawn is now prepared, with the points $P_1'$ $P_2'$ $A_1'$ $B_1'$ $C_1'$ $A_2'$ $B_2'$ $C_2'$ plotted on it to the scale 1/N. By normal optical projection or other suitable means the plane-of-reference projections of the plates $G_1$ and $G_2$ may now be alternately cast on or transferred to the map surface without appreciable distortion, the plane-of-reference projection of plate $G_1$ being correctly located by means of the plotted points $A_1'$, $B_1'$, $C_1'$, which also appear on the plane-of-reference projection, and the corresponding projection of plate $G_2$ being correctly located by means of the plotted points $A_2'$ $B_2'$ $C_2'$, in a perfectly obvious manner. The projection of the plate $G_1$ will then show the position of the point $W_1'$ corresponding with the object W, while the projection of the plate $G_2$ will show the corresponding position $W_2'$. The intersection of the lines $P_1'$ $W_1'$ and $P_2'$ $W_2'$ will then give the map position of W, while the measured distance $W_0$ $W_1'$, multiplied by the height $P_1'$ $P_1$ divided by the measured distance $P_1'$ $W_1'$, or the measured distance $W_0$ $W_2'$ multiplied by the height $P_2'$ $P_2$ divided by the measured distance $P_2'$ $W_2'$ will be equal to the height $W_0$ W of the object W above the plane of reference, these measurements of course being on a scale 1/N times that of nature. The position in space of W is thus determined. All objects such as W appearing in both photographs may be similarly located, and in this way data obtained for the preparation of a map of the region common to the two photographs $G_1$ $G_2$.

Should the operator be in doubt as to whether the two plane-of-reference projections have been obtained from the correct centers of projection, owing to the ambiguity of these positions when only three control points are used, he can satisfy himself on this point by determining the height of an object such as W by means of both displacements $W_0$ $W_1'$ and $W_0$ $W_2'$, as hereinbefore described. If these two determinations of the height of W agree, this is a proof that the correct centers of projection have been chosen for the two plane-of-reference projections, while a lack of agreement, beyond the range of experimental error, will indicate that at least one plane-of-reference projection has been obtained from the wrong projection center. The object chosen for this check on the correctness of the centers of projection should not lie near any of the three lines inter-connecting the three control points in nature. While actual experiment has shown that this ambiguity in the position of the correct center of projection in the three point method of control will occasion no difficulty if the precautions hereinbefore mentioned are observed, this method of checking the correctness of the projections answers any objections which may be raised on this score.

It is not necessary that the same control triangle should be used in obtaining projections of the two photographs to be used in conjunction with each other for mapping purposes by the method described. It is only necessary that each photograph show three points, the positions of which are known, so that a control triangle may be established for each of the photographs, and that the two photographs include a common area to be mapped. This follows because the primary function of the control triangles is to enable the centers of projection $P_1$ and $P_2$ and the station points $P_1'$ $P_2'$ to be determined, these points corresponding with the positions of the cameras at the time the photographs were taken and obviously being the same irrespective of what particular control triangles may be utitlized to determine them.

The mathematical theory of the method will now be dealt with. The discussion will begin with an examination of some of the geometrical properties of the control triangles employed in projecting the photographs, and will then proceed with the mathematical theory of the projection apparatus shown in Figure 3.

The control triangles may be divided into two classes, which for convenience will be termed positive and negative triangles. A positive triangle may be defined as one in which, to an observer standing at the point of intermediate height, and facing towards the opposite side of the triangle, the highest point will be towards his right, the lowest point towards his left. A negative triangle is one in which an observer similarly placed will see the highest point on his left and the lowest on his right. In plotting a control triangle in which all the points are at the same height, any of the points may be taken as the high point, and any other point as the low point. If two points in a control triangle are at the same height, either of these two points may be taken as the higher.

In Figure 5, which is a perspective diagram, let A B C represent the control triangle dealt with in the previous discussion, A being the highest point called the high point, B the lowest, called the low point, and C the point of intermediate height called the intermediate point (A B C Figure 5 is a positive triangle, since to an observer standing at C, A appears on the right and B on the left). Let OX OY OZ represent the axes of rectangular coordinates to which the positions of A B C are referred. Project the triangle A B C orthogonally on the horizontal plane passing through C, A projecting to A' and B to B', and let C M be the line of intersection of the plane of A B C with the horizontal plane through C. M, which will be called the "mid point" of the triangle, is that point on the line joining the high to the low point which is at the same height as the intermediate point. This line C M will be called the "mid line" of the triangle. From A let fall a normal on the mid line C M or C M produced, meeting this line in E. Project the figure A B C M E on the plane $z=o$ to form the figure $A_0 B_0 C_0 M_0 E_0$. Produce the line E A' to A'' making E A'' equal to E A. A'' is then the position which would be occupied by A if the triangle A B C were rotated about the line C M into the horizontal plane, B'' being the corresponding position which would be occupied by B. Project the points A'' and B'' on the plane $z=o$, $A_0''$ and $B_0''$ being the positions thus found. Join $M_0$ to $C_0$, $A_0$ to $C_0$ and $A_0''$ to $C_0$, and produce these lines to meet the axis of X in the points U V and V' respectively. By the construction of the figure it is seen that the angle A E A', designated $\eta$, is equal to the dihedral angle between the plane of the triangle A B C and the horizontal. Let $\chi$ be the angle M C A and $\chi_H$ the projection of this angle on the horizontal plane. The angle M C A'' is equal to $\chi$ and is equal to the angle $M_0 C_0 A_0''$. The angles which the lines $M_0 C_0$, $A_0 C_0$ and $A_0'' C_0$ make with the axis of X are designated $\mu$ $\alpha_H$ and $\alpha$ respectively, as shown. The angle A C A' is designated $\eta'$.

Let $(x_A\ y_A\ z_A)$ $(x_B\ y_B\ z_B)$ and $(x_C\ y_C\ z_C)$ be the rectangular coordinates in space of the points A B and C. It is then evident, by the ordinary methods of solid geometry that the following relationships hold:—

The lengths of the three sides of the triangle are given by

I. $AC = \sqrt{(x_C-x_A)^2+(y_C-y_A)^2+(z_C-z_A)^2}$
$CB = \sqrt{(x_B-x_C)^2+(y_B-y_C)^2+(z_B-z_C)^2}$
$AB = \sqrt{(x_B-x_A)^2+(y_B-y_A)^2+(z_B-z_A)^2}$ The X, Y and Z coordinates of the midpoint M are given by II. $x_M = x_A + (x_B-x_A)(z_C-z_A)/(z_B-z_A)$
$y_M = y_A + (y_B-y_A)(z_C-z_A)/(z_B-z_A)$
$z_M = z_C$ and the following relationships hold concerning the angles shown in Figure 5.

III. $\tan \mu = (y_M-y_C)/(x_M-x_C)$
IV. $\tan \alpha_H = (y_A-y_C)/(x_A-x_C)$
V. $\chi_H = \pm(\mu-\alpha_H)$
VI. $\sin \eta' = (z_A-z_C)/AC$
VII. $\tan \eta = \tan \eta'/\sin \chi_H$
VIII. $\tan \chi = \tan \chi_H/\cos \eta$
XI. $\alpha = \mu-\chi$ Equations I, II, III, VII, VIII, and IX are employed in the calculation connected with the projections, while IV, V, and VI are used only in deriving VII, VIII, and IX. In Equation V, the upper of the alternative signs is to be used in connection with positive triangles, the lower in connection with negative triangles. The angle $\chi$ is taken as the angle included between the mid line and the line joining the high to the intermediate point in the plane of the triangle, whether the triangle is positive or negative. The signs of the angles $\chi$ $\eta$ are taken to correspond with the sign of the triangle in which they occur, being positive in positive triangles; and vice versa.

In dealing with the mathematical theory of the projection apparatus shown in Figure 3 it is first necessary to establish a convention as to the method of plotting triangles on the screen 26 and as to the signs of the angles indicated on the two circular scales of the screen mounting. A convenient convention for plotting the triangles, but not the only possible one, will be to plot the intermediate point, corresponding to C, Figure 5, at the screen centre, to plot the high point corresponding to A, Figure 5, on the horizontal axis of the screen to the right of the screen centre as viewed from the projection camera. The third point, corresponding to the lowest point of the triangle, such as B Figure 5, is plotted above the horizontal line joining the other two plotted points if the triangle is a positive one, and below this line, if the triangle is a negative one. The triangle $a'$ $b'$ $c'$, Figure 3, representing the positive triangle A B C shown in Figure 1, is plotted in accordance with this convention.

A suitable convention with regard to the signs of the angular displacements of the screen mounting will be to reckon angular displacements about the horizontal axis positive when the upper part of the screen is advanced toward the projection camera, and to reckon angular displacements about the vertical axis positive when the right hand side of the screen, as viewed from the projection camera, is advanced towards the projection camera; and vice versa. The zero position for both angular adjustments of the screen as previously stated is when the plane of the screen is vertical and normal to the axes of linear motion 4—c, Figure 3. In accordance with this convention both angular displacements corresponding with the position of the screen shown in Figure 3 are positive.

The exact nature of the operations carried out with the projection apparatus will now be considered. After the projection camera has been correctly adjusted there are three adjustments to be made to the screen affecting (1) the distance between the camera and screen (2) the orientation of the screen about the vertical axis, and (3) the corresponding orientation about the horizontal axis; these adjustments resulting in an exact coincidence between the projected and plotted triangles. It may be supposed for convenience that these three operations are carried out completely in the above order, beginning with the plane of the screen vertical and normal to the axis of linear motion. Consideration will show that with the screen in this initial position the orthogonal projection of the lens centre 4 on the screen 26 will lie at the screen centre, and this condition will continue to hold after operation (1) has been effected. During operation (2) the orthogonal projection of 4 on the plane of this screen travels along the horizontal axis of the screen, arriving when the operation is completed at some such point as 38, Figure 3. During operation (3) the orthogonal projection of 4 on the plane of the screen travels from this point 38 in a direction at right angles to the horizontal axis of the screen, arriving when the operation is completed at some such point as 39, Figure 3, where $c'$—38 and 38—39 are at right angles. It is evident that operation (2) is equivalent to maintaining the plane of the screen (and therefore of the plotted control triangle) fixed, and swinging the external principal point of the lens 4 through the arc of a circle having the screen centre (the intermediate point of the plotted triangle) as centre, the plane of this circle intersecting the plane of the screen (and therefore of the plotted triangle) in the horizontal axis (the line joining the high to the intermediate point in the plotted triangle), the plane of this circle being normal to the plane of the screen (and therefore normal to the plane of the plotted triangle). Similarly operation (3) is equivalent to maintaining the plane of the screen (and therefore of the plotted triangle) fixed, and rotating the lens centre 4 through the arc of a circle lying in a plane normal to the plane of the screen (and therefore normal to the plane of the plotted triangle) and normal to the plane of the circle considered in the operation equivalent to operation (2) the centre of this second circle lying on the horizontal axis of the screen (and therefore on the line joining the high to the intermediate point of the plotted triangle, or this line produced).

If in these equivalent operations the angles through which the lens centre 4 is swung are equal to the angles through which the screen is actually rotated in operations (2) and (3), due regard being paid to the signs of these angles, then the final relative configuration in space of the points 4 $a'$ $b'$ $c'$ resulting from the equivalent operations will be identical with that effected by the actual operations (2) and (3). It will therefore be assumed that these equivalent operations are carried out, as the geometrical representation of these equivalent operations is considerably simpler than that involving the actual operations (2) and (3).

Figure 6:
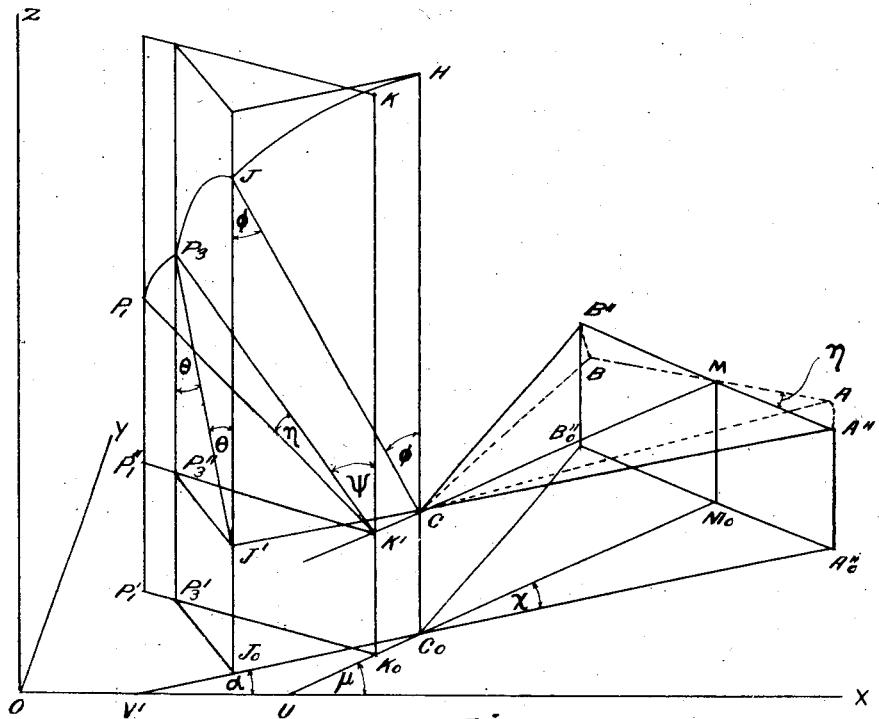

Figure 6 is a perspective diagram, illustrating the principles of the operation of the projection apparatus. Suppose that a correct coincidence has been effected between the projected image of the control triangle $A_1$ $B_1$ $C_1$ appearing on the photographic plate $G_1$ and the corresponding plotted control triangle $a'$ $b'$ $c'$, by means of the projection apparatus shown in Figure 3 as already described. Let the distance between lens centre and screen centre corresponding to this coincidence be D, the orientation of the screen about the vertical axis be $\phi$, the orientation of the screen about the horizontal axis be $\theta$, and the scale of the plotted triangle be 1/N.

Let the triangle A B C Figure 6 represent the control triangle $a'$ $b'$ $c'$ plotted on the screen 26, Figure 3 and let the position of $P_1$, Figure 6 relative to A B C correspond with the position of the external principal point of the lens 4 relative to the plotted triangle $a'$ $b'$ $c'$ in the projection apparatus when the correct coincidence between the projected and the plotted triangles has been effected. Let the position of the axes of coordinates OX OY OZ relative to the triangle A B C correspond with the position of the axes of coordinates in nature relative to the control triangle in nature.

Let C M be the mid line of the triangle A B C and let $\eta$ be the dihedral angle included between the plane of A B C and the horizontal. From $P_1$ let fall a normal $P_1 K'$ on the line C M or C M produced. Rotate the system $P_1$ A B C through the angle $\eta$ about the axis C M, so that the triangle A B C assumes the horizontal position A" B" C, and the point $P_1$ moves to $P_3$. The relative configuration of the four points $P_3$ A" B" C is now identical with $P_1$ A B C, so that A" B" C may now be considered to represent the plotted triangle $a'$ $b'$ $c'$ on the screen 26, and $P_3$ the external principal point of the lens 4, the apparatus still being adjusted for coincidence of projected and plotted triangles.

Project the points $P_1$ $P_3$ K' C A" B" M orthogonally on the horizontal plane of reference $z=o$, the positions then found being $P_1'$ $P_3'$ $K_0$ $C_0$ $A_0''$ $B_0''$ $M_0$. Produce $C_0$ $M_0$ and $C_0$ $A_0''$ to meet the axis of X at U and V' respectively. Using the notation employed in connection with Figure 5, $M_0$ U X is the angle $\mu$, $A_0''$ V' X is the angle $\alpha$, and $M_0$ $C_0$ $A_0''$ is the angle $\chi$. Join $P_3$ to K'. By construction the angle $P_3$ K' $P_1$ is equal to the dihedral angle $\eta$. Through K' draw the vertical line K' K. The angle $P_3$ K' K will be termed the "mid-line declination" and will be denoted as $\chi$. This angle may be defined as the dihedral angle which the plane including the mid line of the control triangle in nature and the aeroplane position makes with the plane which intersects the plane of the control triangle normally in the mid line.

Through C draw the vertical line C H making C H=D, the distance between screen centre and lens centre, determined by operation (1) of the projection apparatus. With C as centre and C H as radius describe the arc H J of a circle lying in the vertical plane passing through C A" making the angle H C J=$\varphi$ the angle through which the screen was rotated in operation (2). From J drop a perpendicular on the zero plane which will meet $C_0$ $A_0''$ or $C_0$ $A_0''$ produced, in $J_0$ and C A" or C A" produced, in J'. With J' as centre and J J' as radius described the arc J $P_3$ of a circle lying in the vertical plane normal to the plane of the angle H C J, and making J J' $P_3$=$\theta$, the angle determined by operation (3) of the projection apparatus. $P_3$ is the point previously located by swinging $P_1$ about the centre K' through the angle $\eta$ in the vertical plane.

It is necessary of course that the signs of the angles $\varphi$ and $\sigma$ in the above construction should agree with the corresponding angles of adjustment of the screen in operations (2) and (3), using whatever convention of sign has been adopted. Using the conventions which have previously been stated it is seen that in Figure 6 A B C is a positive triangle and that $\varphi$ is negative and $\sigma$ positive.

If the photograph has been properly projected, it is seen from the foregoing theory and the above construction that the relative position of the point $P_1$ and the triangle A B C correspond exactly with the aeroplane position at the time the photograph was taken relative to the control triangle in nature. Since in the figures the triangle A B C is placed relative to the axes of coordinates in a similar manner to the arrangement of the control triangle and axes of coordinates in nature, it follows that the coordinates of the point $P_1$ in the diagram relative to the axes of coordinates shown will correspond with the position of the aeroplane relative to the axes of coordinates in nature. Thus if all the linear dimensions of the diagram are increased in the ratio N:1, A B C may be regarded as the control triangle in nature, with $P_1$ the aeroplane position, O the origin of coordinates and $P_1'$ the projection $P_1$ on the horizontal plane of reference. It will be assumed that this change in the dimensions of the diagram has been effected, the length H C being changed from D to N D. The problem then is to find the coordinates of $P_1$ and $P_1'$ Figure 6, corresponding to the points $P_1$ and $P_1'$, Figure 1.

If in Figure 6 H C be taken as equal to N D, it is obvious from the construction that the following relationships hold:—

$$J'C = J_0 C_0 = ND \sin \phi$$
$$JJ' = ND \cos \phi$$
$$P_3''J' = P_3'J_0 = ND \cos \phi \sin \theta$$
$$P_3''P_3 = ND \cos \phi \cos \theta$$

The component of $J_0$ $C_0$ normal to the projected line $C_0$ $M_0$ is equal to N D sin $\phi$ sin $\chi$, and the component of $J_0$ $P_3'$ normal to the same line is equal to N D cos $\phi$ sin $\theta$ cos $\chi$. It therefore follows, since $P_3''$ $P_3$=N D cos $\phi$ cos $\theta$ that $$X \tan \psi = \frac{\sin \phi \sin \chi + \cos \phi \sin \theta \cos \chi}{\cos \phi \cos \theta}$$

which fixes the value of the mid-line declination. The mid-line declination $\psi$ is reckoned positive when $P_3''$ lies to the left of the mid line, looking in the direction of the mid point M as viewed from the intermediate point C. Remembering that $P_3''$ $P_3$=N D cos $\phi$ cos $\sigma$ it may be shown by plane trigonometry that the following relationships hold in the plane figure $P_1''$ $P_1$ $P_3$ K' $K_0$ $$P_3'P_1' = P_3''P_1'' = ND \cos \phi \cos \theta \sec \psi [\sin (\psi - \eta) - \sin \psi]$$
$$P_1''P_1 = ND \cos \phi \cos \theta \sec \psi \cos (\psi + \eta)$$

The rectangular coordinates $x_P$ $y_P$ $z_P$ of $P_1$, the aeroplane position, may now be written down, the $x$ coordinate being obtained by adding to the $x$ coordinate of C the components of the displacements $C_0$ $J_0$ $J_0$ $P_3'$ and $P_3'$ $P_1'$ parallel to the axis of $x$, the $y$ coordinate similarly being obtained by adding to the $y$ coordinate of the C the components of these same displacements parallel to the $y$ axis. The $z$ coordinate of $P_1$ is given by adding the height $P_1''$ $P_1$ to the $z$ coordinate of C. We then obtain the expressions:—

XI.   $x_p = x_c + ND [\sin \phi \cos \alpha + \cos \phi \sin \theta \sin \alpha + \cos \phi \cos \theta \sec \psi [\sin (\psi + y) - \sin \psi] \sin \mu]$
$y_p = y_c + ND [\sin \phi \sin \alpha + \cos \phi \sin \theta \cos \alpha + \cos \phi \cos \theta \sec \psi [\sin (\psi + y) - \sin \psi] \cos \mu]$
$z_p = z_c + ND \cos \phi \cos \theta \cos \theta (\psi + \eta) \sec \psi$ These equations determine the aeroplane position, corresponding to the position $P_1$, Figure 1. The position corresponding to $P_1'$, Figure 1 is of course obtained by putting $z_p$ in the third equation equal to zero or equal to whatever value the height of the horizontal plane of reference may have.

With regard to the convention of signs to be adopted in connection with the foregoing equations, a method can be devised whereby the signs of the terms appearing in the expressions for $x_p$ $y_p$ and $z_p$ may be made to depend on the sign of the control triangle, and the signs of the angles $\phi$ and $\theta$. Such a method would however prove cumbersome in actual practice. The following method which is simple in application has therefore been devised.

The terms $x_c$ $y_c$ and $z_c$ are of known sign, from the data concerning the control triangle. The second term in the expression for $z_c$ will practically always be positive in the case of aeroplane photography. Should the unusual case occur, however, in which it is negative, this will be indicated by the fact that the value of $\psi + \eta$ does not lie between the limits $+90°$ and $-90°$ (c. f. Figure 6). It appears therefore that the only difficulty with regard to sign will occur in connection with the terms within the square brackets in the expressions for $x_p$ and $y_p$. The signs of these terms may be found as follows.

Figure 7:
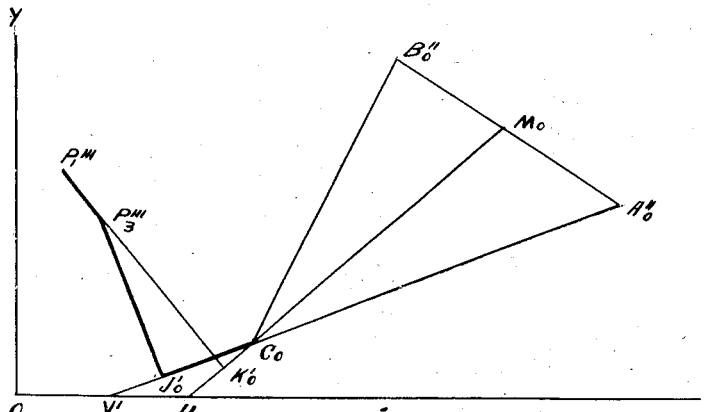

Consider, as in Figure 6 that the plane of the control triangle has been rotated about the mid line into the horizontal. Plot on squared paper the projection of this rotated triangle on the horizontal plane of reference showing its position relative to the $x$ and $y$ axes of coordinates. Figure 7 shows the triangle $A_0''$ $B_0''$ $C_0$ so plotted, the lettering of Figure 7 corresponding with Figure 6. Produce the line $A_0''$ $C_0$, joining the high and the intermediate points of the triangle, and produce $M_0$ $C_0$, these two lines produced meeting the $x$ axis in V and U respectively. From $C_0$ lay off along the line $C_0$ $A_0''$ or $C_0$ $A_0''$ produced some convenient length $C_0$ $J_0'$, this line being drawn from $C_0$ toward $A_0''$ if $\varphi$ is positive, and from $C_0$ away from $A_0''$ if $\phi$ is negative. From $J_0'$ draw a line $J_0'$ $P_3'''$ of any convenient length, at right angles to $C_0$ $A_0''$, this line being directed toward the same side of $C_0$ $A_0''$ as B if $\theta$ is positive, and on the other side of $C_0$ $A_0''$ if $\theta$ is negative. From $P_3'''$ draw a line $P_3'''$ $P_1'''$ of any convenient length at right angles to the mid line $C_0$ $M_0$. If the control triangle is positive this line is drawn toward the left of an observer standing at $C_0$ and facing $M_0$, and vice versa.

The directions of the three lines $C_0$ $J_0'$ $J_0'$ $P_3'''$ and $P_3'''$ $P_1'''$ taken in order correspond with the displacements determining the values of the three terms within the square brackets in the expression for $x_p$ and $y_p$, taken in order. It is possible to determine the sign of the $x$ and $y$ components of these three lines by simple inspection. The figure as drawn corresponds with a positive triangle, a negative value of $\varphi$ and a positive value of $\theta$. By simple inspection the sign of the corresponding terms within the brackets will be for $x_p$ $(---)$ and for $y_p$ $(-++)$. Any practical example may be dealt with by this simple method, which has the advantage that the function of all angles may be regarded as positive and that a graphical check is provided for the calculated values of $\alpha$ and $\chi$ as dependent on $\mu$.

The method of determining the central projection of the control triangle in nature on the horizontal plane of reference from the aeroplane position as centre of projection will now be considered. If $P_1$ is the centre of projection, A B C the control triangle, and if the height of the plane of reference is $z_R$, the coordinates of the projections $A_1'$ $B_1'$ and $C_1'$ of A B and C are given by the following equations.

XII.   $x_{A_1}' = x_A + (x_A - x_{P_1})(z_A - z_R)/(z_{P_1} - z_A)$
$y_{A_1}' = y_A + (y_A - y_{P_1})(z_A - z_R)/(z_{P_1} - z_A)$
$x_{B_1}' = x_B + (x_B - x_{P_1})(z_B - z_R)/(z_{P_1} - z_B)$
$y_{B_1}' = y_B + (y_B - y_{P_1})(z_B - z_R)/(z_{P_1} - z_B)$
$x_{C_1}' = x_C + (x_C - x_{P_1})(z_C - z_R)/(z_{P_1} - z_C)$
$y_{C_1}' = y_C + (y_C - y_{P_1})(z_C - z_R)/(z_{P_1} - z_C)$

If the horizontal plane of reference is sea level, $z_R$ is put equal to zero.

The points $A_1'$ $B_1'$ $C_1'$, determined by equations XII are shown similarly designated in Figure 1.

The triangle formed by the points determined by equation XII is now plotted to the scale $1/N$ on the screen 26 with $C_1'$ at the centre and $A_1'$ on the horizontal screen axis. By means of the projection apparatus the control triangle in the projected image of the plate is then made to coincide with this plotted triangle. This having been accomplished, a photographic plate is exposed in place of the screen, and a positive of this projection obtained. This is the photographic positive of the plane-of-reference projection of the plate $G_1$ to the scale $1/N$ already referred to.

In a similar manner a photographic positive is obtained of the plane-of-reference projection of the plate $G_2$ to the scale $1/N$.

To briefly recapitulate the steps to be carried out in practicing the method described above in detail, the procedure is as follows:—

1. Procure two photographs taken from different positions, each photograph showing the area to be mapped and also showing three points, the map positions and elevations of which are known, the three points in each photograph determining a control triangle for that photograph. The exact relationship of the plate to the camera lens at the time each photograph was taken must be known.

2. Calculate the dimensions of the control triangles from the known coordinates of the three known points in accordance with Equations I.

3. Plot the control triangle for one of the photographs on the screen 26, in the manner described, with the point of intermediate height at the screen center and the high point of the triangle on the horizontal axis of the screen.

4. Place the first photograph in a projection apparatus in the same relationship to the lens of such apparatus that the plate occupied with respect to the camera lens at the time of exposure.

5. Project the first photograph centrally on the screen and adjust the camera and screen, as described above, to secure coincidence between the projected image and the plotted triangle.

6. By reading the scales of the apparatus determine the distance between the lens and the screen center, and the vertical and horizontal deflections of the screen.

7. Calculate the airplane position or center of projection $P_1$ and the orthogonal projection $P_1'$ of this point on the plane of reference by means of Equations II to XI.

8. Calculate the positions of $A_1'$ $B_1'$ $C_1'$ representing the central projection of the control triangle on the plane of reference, by means of Equations XII.

9. Plot the triangle $A_1'$ $B_1'$ $C_1'$ on the screen 26.

10. Project the first photograph upon the screen and secure coincidence between the projected image and the plotted triangle $A_1'$ $B_1'$ $C_1'$ in the manner described. The angular adjustment of the camera remains the same as before it being only necessary to adjust the distance between the camera and screen and to adjust the angularity of the screen until the coincidence is secured.

11. Substitute a photographic plate for the screen 26, the angular adjustments of the screen holder remaining unchanged, and expose this plate so as to procure a positive reproduction of the photographic image projected thereon, this positive reproduction representing the "plane-of-reference projection".

12. Perform operations corresponding to steps 3 to 11 with the second photograph, thereby procuring a "plane-of-reference projection" of such photograph.

13. Plot on a mapping surface the points $P_1'$ and $P_2'$ and the points corresponding with the projections of the control triangles of the two photographs on the plane of reference (points $A_1'$ $B_1'$ $C_1'$ $A_2'$ $B_2'$ $C_2'$).

14. By a normal optical projection or otherwise alternately cast on or transfer to the map surface in exact reproduction the two plane-of-reference projections and accurately locate them with reference to the plotted points on the map surface by procuring coincidence between the projections of the control triangles appearing in the plane-of-reference projections and the corresponding plotted points on the map surface.

15. Plot on the map surface the points $W_1'$ and $W_2'$ appearing in the two plane-of-reference projections, these points being the central projections on the plane of reference of the point $W$ whose position is to be determined.

16. Draw on the map surface the lines $P_1'$ $W_1'$ and $P_2'$ $W_2'$, the intersection of which fixed the point $W_0$ which is the map position of the point $W$.

17. Measure the distance $W_0$ $W_1'$ and $P_1'$ $W_1'$ (or $W_0$ $W_2'$ etc.) and from these distances and the height of the point $P_1$ (or $P_2$ as the case may be), already known, calculate the height $W$ $W_0$. The position of $W$ is now definitely determined and obviously the position of any similar point shown in both photographs may be determined in like manner so that the area common to photographs may be completely mapped.

A comparison of the hypothetical procedure of carrying out this method with the practical process described leads at once to the conclusion that there is a wide latitude in the choice of the mechanical means of dealing with the original photographs to obtain the plane-of-reference projections required for actual mapping. It seems probable, however, that apparatus constructed on the general principles of that shown in Figure 3 will be found most suitable in practice.

But if this apparatus or similar mechanical means is employed there still remain some important variations of procedure which are worth considering. Two of these will be discussed.

(1) After a coincidence has been effected between the projected triangle and the first triangle plotted on the screen, similar to the control triangle in nature in its own plane, the process of subsequently obtaining a coincidence between the projected triangle and the triangle plotted in accordance with Equation XII is simply equivalent to rotating the screen through the angle $\eta$ into a position corresponding with the horizontal plane passing through the intermediate point C in nature, and then lowering the screen by a motion of pure translation into a position corresponding to the plane of reference in nature, and obtaining the projection of the original photographic plate on this plane. This process may be carried out as follows:

It is obvious that after the coincidence between the projected image and the first plotted triangle has been obtained, there must be some two angular displacements about the two independent axes of rotation of the screen mount which will result in rotating the plane of the screen through the dihedral angle $\eta$ and bringing it into a position corresponding with the horizontal plane passing through the position of the intermediate point of the control triangle in nature. It may be shown by the methods of spherical trigonometry that if $\phi$ and $\theta$ are the angular displacements about the vertical and horizontal axes of adjustment of the screen mount which result in a coincidence of the projected and the first plotted triangle, the corresponding additional angular displacements $\phi'$ and $\theta'$ which will rotate the plane of the screen into a position corresponding with the horizontal are given by the three equations:—

XIII.  $\tan \tfrac{1}{2}(A+\phi') = \dfrac{\cos \tfrac{1}{2}(90°-\theta-\eta)}{\cos \tfrac{1}{2}(90°-\theta+\eta)} \cot \tfrac{1}{2}\chi$ $\tan \tfrac{1}{2}(A-\phi') = \dfrac{\sin \tfrac{1}{2}(90°-\theta-\eta)}{\sin \tfrac{1}{2}(90°-\theta-\eta)} \cot \tfrac{1}{2}\chi$ $\tan \tfrac{1}{2}(90°-\theta-\theta') = \dfrac{\sin \tfrac{1}{2}(A+\phi')}{\sin \tfrac{1}{2}(A-\phi')} \tan \tfrac{1}{2}(90°-\theta-\eta)$ If the screen is rotated through these additional angles $\phi'$ and $\theta'$ about the vertical and horizontal axes of adjustment respectively, and if the distance between the lens centre and screen centre is then increased in the ratio $(z_P-z_R):(z_P-z_C)$ using the notation already employed, the screen will then be in a position which would effect an exact coincidence between the projected triangle and a plotted triangle conforming to Equations XII. This triangle therefore need not be plotted, and the plane of reference projection may be obtained without its use. It is necessary however that Equations XII should be solved to locate the plane of reference projection when this is transferred to the mapping surface.

It thus appears that this alternative procedure has the disadvantage of involving additional mathematical calculation. It however has the advantage of greater accuracy in the final result, as the production of the plane-of-reference projection of the photograph involves only one adjustment of the apparatus, determined by a coincidence between projected and plotted triangles, and the cumulative errors resulting from two such operations are therefore avoided.

(2) The second variation of procedure which will be considered is of greater importance. It consists of plotting the control triangle on the screen with the mid line coinciding with the horizontal axis of the screen, the intermediate point being plotted as before at the screen centre. As in the first method this plotted triangle is an exact reproduction of the control triangle in nature, in its own plane. This method has the disadvantage that it makes the operation of obtaining a coincidence between projected and plotted triangles considerably more difficult, but it has the great advantage of considerably reducing the mathematical labor involved in calculating the aeroplane position.

Figure 8:
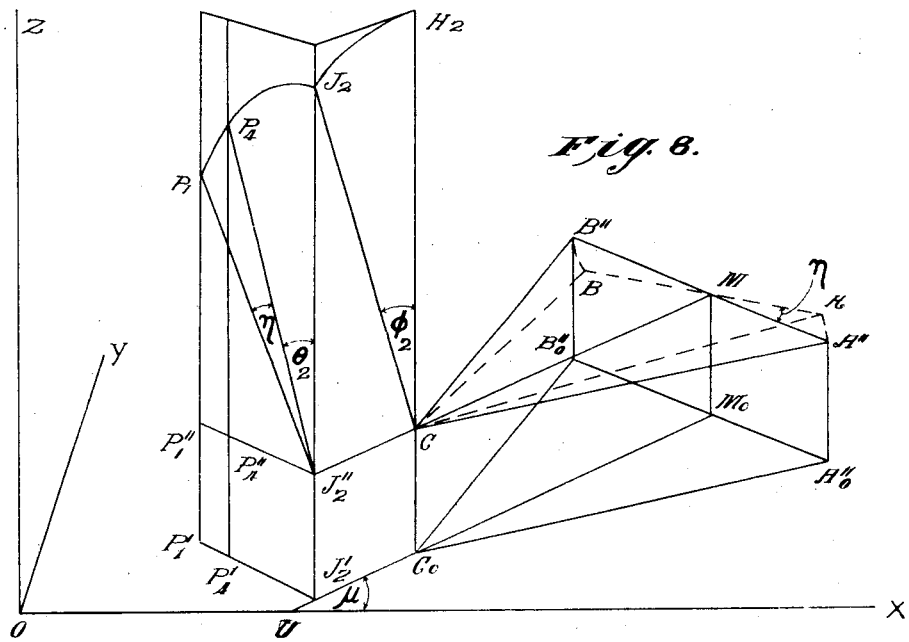
Figure 9:
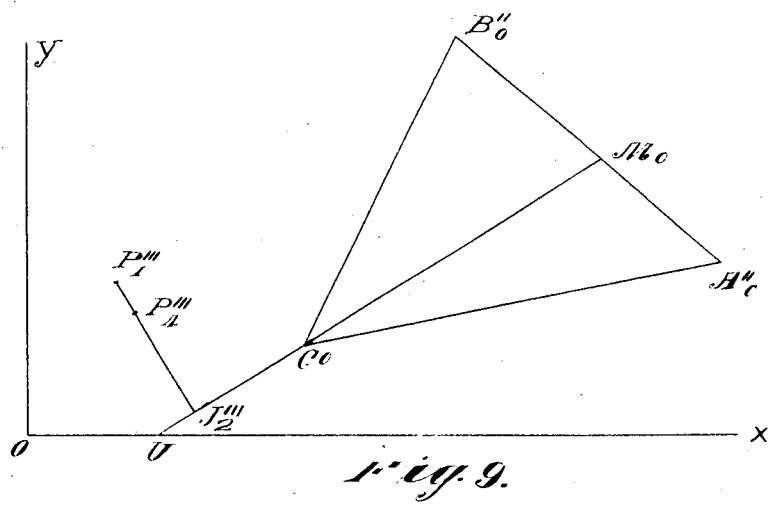

Referring to Figures 8 and 9 it will be seen that if this method of plotting the control triangle be adopted, when a coincidence between projected and plotted triangles is effected the displacement of the orthogonal projection of the lens centre on the plane of the screen corresponding to the angular adjustment $\phi$ will occur along the mid line of the plotted triangle, or this line produced, the displacements corresponding to $\theta$ and the correction for $\eta$ both occurring in the same line, normal to the mid line.

Figure 8 illustrates the geometry of this second method, and is constructed in a way strictly analogous to that employed in constructing Figure 6, and relates to the same control triangle A B C, Figure 1. The control triangle A B C, correctly located with respect to the axes of co-ordinates shown, is rotated about the mid line C M into the horizontal position A″ B″ C″. Suppose that a coincidence has been obtained between the projected images of the photographic images $A_1$, $B_1$, $C_1$, Figure 1, and the triangle $a_1$, $b_1$, $c_1$, plotted on the screen according to this second method, with the mid line coinciding with the horizontal axis of the screen. The plotted triangle $a_1$ $b_1$ $c_1$ is of course an exact reproduction of the triangle A B C in nature in its own plane. Let $D_2$ be the distance from the screen centre to the external principal point of the projection lens, $\varphi_2$ the orientation of the screen about the vertical axis, $\theta_2$ the orientation of the screen about the horizontal axis, and $1/N$ the scale of the plotted triangle $a_1$ $b_1$ $c_1$. From C erect a perpendicular C $H_2$ equal to N $D_2$. With C as centre and C H as radius construct the arc $H_2$ $J_2$ of a circle lying in the vertical plane passing through the mid line C M, making the angle $J_2$ C $H_2$ equal to $\varphi_2$. From $J_2$ drop a perpendicular on C M, or C M produced, meeting this line in $J_2''$. With $J_2''$ as centre and $J_2''$ $J_2$ as radius describe the arc $J_2$ $P_4$ of a circle lying in the vertical plane normal to the plane of $H_2$ C $J_2$, and making the angle $J_2$ $J_2''$ $P_4$ equal to $\theta_2$. Continue the arc $J_2$ $P_4$ to $P_1$, making the angle $P_4$ $J_2''$ $P_1$ equal to the dihedral angle $\eta$. (In constructing this figure the convention with regard to the signs of the angles $\psi_2$, $\theta_2$ and $\eta$ is the same as that adopted in construction Figure 6.) $P_1$ is the aircraft position with respect to the triangle A B C. Project the points $P_1$ and $P_4$ on the horizontal plane through C, meeting this plane in the points $P_1''$ and $P_4''$. Project the points $P_1''$ $P_4''$ $J_2''$ C B'' M A'' orthogonally on the zero plane forming the figure $P_1'$ $P_4'$ $J_2'$ $C_0$ $B_0''$ $M_0$ $A_0'''$. Produce $C_0$ $M_0$ to meet the axis of X in U, making with this axis the angle $\mu$. It may be shown in a manner similar to that adopted in dealing with Figure 6 that the coordinates of $P_1$ are given by the equations:—

$$\text{XI}'. \quad x_p = x_c + ND\{\sin\phi \cos\mu + \cos\phi \sin(\theta+\eta) \sin\mu\}$$
$$y_p = y_c + ND\{\sin\phi \sin\mu + \cos\phi \sin(\theta+\eta) \cos\mu\}$$
$$z_p = z_c + ND \cos\phi \cos(\theta+\eta)$$

The signs of the terms within the brackets are determined by inspection of Figure 9, which is constructed in a similar manner to that employed in constructing Figure 7, and may be readily understood by reference to Figure 8. The direction of the displacement $C_0$ $J_2'''$, corresponding with that produced by the angular displacement $\varphi_2$, determines the signs of the first terms within the brackets, and the displacement $J_2'''$ $P_1'''$, corresponding to the combined angular displacement $\theta_2$ and $\eta$, similarly determines the signs of the second terms within the brackets, in a manner which will be evident by referring to the method of determining signs by means of Fig. 7, as previously explained.

If this second modification is adopted it will be convenient to have the adjustments of the projection camera arranged somewhat differently. The two angular adjustments about the vertical and horizontal axis in the camera are retained. In place of the circular adjustable plate holder however, a fixed plate-holder should be provided, and the camera should be mounted so that it may be rotated about an axis coinciding with the axis of linear motion without disturbing the first two angular adjustments. The reason for this alteration is that the mid point of the control triangle does not appear on the original photograph, so that the correct orientation of the plate can only be determined by the final coincidence between the projected and plotted triangles. The above alteration in the apparatus provides a means of adjusting this orientation without disturbing the other camera adjustments.

A form of projection camera and mounting embodying these principles is shown in Figures 10 to 14 inclusive. Referring to these figures, a carriage 40 is provided which runs on wheels 41 on the two parallel horizontal rails 42, and which has at each end a rigid upright support 43. The camera 44 is mounted within a revolving cradle consisting of two end plates 45 and 46 connected by four rods 47. Turned metal members 48 and 49, the latter in the form of a ring, are rigidly attached to the plates 45 and 46 respectively, and rest in holes drilled in the vertical supports 43 of the carriage 40, in which they are free to turn, so that the cradle carrying the camera is free to turn about the horizontal axis 50—51, this axis being parallel to the axes of the rails 42. Two rack rails 52 are rigidly attached to the rods 47, and a rectangular framework 53 is arranged to travel along the two rails 52, its position being controlled by pinions engaging the racks and operated by the milled head 54. A member 55, carried by the framework 53 is arranged to travel on such framework at right angle to the direction of travel of the framework on the rails 52. The position of the member 55 with respect to the framework 53 is controlled by a milled head 56 operating pinions engaging racks on the framework. A ring 58 is attached to the member 55 by means of the gimbal mounting 57, so that the plane of the ring 58 is free to be oriented in any direction. The camera 44 is supported at the rear by means of the round rod 59 rigidly attached to the camera. The axis of the rod 59 coincides with the camera axis 60—61, and the rod 59 passes through the ring 58, with which it forms a sliding fit. The camera is supported at its forward end by a gimbal mounting connected with the turned metal member 49, which is drilled to receive the other gimbal pins. The inner gimbal pins are in contact with the lens mount 62, as shown in Figure 11. The two axes of the gimbal pins in this mounting are arranged to coincide in the axis 50—51 and in the external principal point of the lens. The plate holder is placed at 63, and is incapable of rotation with respect to the camera 44. The flange of the ring 49 which is secured to the plate 46 has gear teeth cut on its periphery, and a pinion wheel 64 co-operating with these gear teeth and operated by the milled head 65, enables the cradle supporting the camera to be rotated about the horizontal axis 50—51. Adjustment of the distance of the plate from the lens is secured by rotating the camera about its axis, the front end of the camera being in screw-threaded engagement with the lens mount as shown at 63 in Figure 13. Apart from the foregoing changes the projection camera is essentially the same as that shown in Figures 3 and 4. The projection screen to be used in connection with this projection camera is similar to the screen 26 and its mounting shown in Figure 3, and is mounted on a carriage on the rails 42 with the screen centre on the axis 50—51, which is therefore the axis of linear motion.

In operating this form of projection camera the projected image of the intermediate point of the control triangle is made to coincide with the screen centre by operating the two milled heads 54 and 56. The projected image of the plate may then be rotated into the correct position by operating the milled head 65, this operation not disturbing the coincidence between the projected image of the intermediate point of the control triangle with the screen centre.

It will be found that a projection camera mounting with its axes arranged in this general way will be most suitable for use with either the first or second method of plotting the control triangle described in this specification.

It is advisable to have a circular scale engraved on the circular plate 49 by means of which the orientation of the camera mounting about the axis of linear motion relative to some known zero may be ascertained, and to have linear scales and pointers provided in connection with the movable members 53 and 55 so that the displacement of the ring 58 from the axis 50—51 may be determined. If the distance parallel to the axis 50—51 from the intersection of the gimbal axes supporting the ring 58 to the intersection of the axes of the gimbals supporting the lens mount is known, these scales will enable the direction of the camera axis to be calculated in an obvious way. If then the direction of the normal to the projection screen when the screen has been adjusted to obtain the plane-of-reference projection is known by means of the two angular adjustments of the screen mounting, the angle between the axis of the camera and the normal to the screen may be calculated by the ordinary methods of spherical trigonometry, and this will obviously be the same as the inclination of the photographic camera axis to the vertical at the instant the photographic plate was exposed. This angle is one of the important constants of the photograph, and this method provides a ready means of calculating its value.

If the second method of plotting the control triangle be adopted (that is, with the point of intermediate height coinciding with the screen centre and the mid line of the triangle coinciding with the horizontal axis of the screen) it will be found a great practical advantage to choose as the plane of reference the horizontal plane passing through the intermediate point of the control triangle in nature. If this plan is followed the plane-of-reference projection may be obtained after the coincidence between the projected and the plotted control triangle has been effected by simply rotating the projection screen about its horizontal axis through the dihedral angle $\eta$ in such a direction that the plotted low point on the projection screen is advanced towards the projection camera, thus bringing the projection screen into the proper position with reference to the projection camera to expose a photographic plate and obtain the positive of the plane-of-reference projection. When this plate is exposed a mark is made on its surface at the position of the mid-point, already plotted on the screen. The positive thus obtained may be correctly located when it is transferred to the mapping surface by plotting on the mapping surface the map positions of the intermediate point and the mid-point to the scale on which the map is to be prepared say $1/N$, and transferring the positive to the mapping surface so that the images of the intermediate point and the marked position on the positive coincide with these two plotted positions respectively. By this procedure the need of employing Equations XII is entirely obviated, and time saved, in the computations.

Heights, as determined by plane-of-reference projections prepared in this way, will have to be added to the height of the intermediate point above sea level in order to obtain heights referred to sea level.

Another form of apparatus suitable to carrying out the method of survey herein disclosed is shown in Figures 17, 18 and 19. Two standards, 75, resting on the horizontal surface of a table, support, by means of pins 76, a ring 77 and a plotting screen 78, so that both ring and plotting screen are independently free to rotate about the horizontal axis 79—80. Two circular scale members 81 and 82 cooperating with pointers on the rigid bracket 83 are arranged to indicate the orientation of the ring 77 and plotting screen 78 from the horizontal plane in which they are shown in Figures 17, 18 and 19. A continuous metal tube 84, bent as shown, is pivoted on the ring 77 by means of pins 85, so that it is free to rotate about the axis 86—87 normal to the axis 79—80, these two axes intersecting in the plane of the screen at the screen centre. A circular scale member 88 cooperating with a pointer attached to the tube 84 enables the angular position of this tube to be determined with reference to the plane of the ring 77, the zero position being that in which the plane of the axis of the tube 84 is normal to the plane of the ring 77, as shown by the dotted line 89—90, Figure 17. The tube 84 passes through holes 91 in the framework 92, forming sliding fits with these holes. The framework 92 can thus be slid up and down the tube 84. The framework 92 carries a rotating cradle 47 and projection camera 44, precisely similar to that shown in Figures 10 to 14, the said camera and framework being arranged to be capable of rotation as a unit about an axis passing through the centres of the holes 93 and 94 in the framework 92. This axis, passing through the screen centre, is the axis of linear motion of the apparatus. A bracket 95 rigidly attached to the framework 92 is connected by a ball and socket joint to the rod 96, so that the framework 92 is capable of rotation about horizontal and vertical axes. The rod 96 passes centrally down the tube 97, being free to slide up and down in this tube and to rotate about its own axis. The tube 97 is rigidly attached to a heavy base 98 free to slide on the horizontal surface of the table supporting the standards 75. Clamping screws 99 and 100 enable the relative position of the framework 92 and the heavy base 98 to be rigidly fixed. A linear scale engraved on the tube 84, cooperating with a pointer, not shown, on the framework 92, is arranged to indicate the distance of the external principal point of the projection lens of the camera supported in the framework 92 from the screen centre.

The method of employing this apparatus will now be considered. Suppose the triangle A B C, Figure 1, appears on two photographs to be employed in this apparatus. An exact reproduction of this control triangle in its own plane is plotted to the scale $1/N$ on the screen 78, with the intermediate point at the screen centre, and the mid line coinciding with the axis 79—80, which corresponds to the horizontal axis of the screen 26 shown in Figure 3. The screen 78 is then rotated about the axis 79—80 so that its plane is inclined to the horizontal at the dihedral angle $\eta$ as read on the scale member 82, the side of the screen on which the high point of the control triangle is plotted being tilted up from the table. The projection camera, supported within the framework 92, is now adjusted by means of the two milled heads corresponding to 54 and 56, Figure 12 so that the projected image of the intermediate point of the control triangle is brought into coincidence with the screen centre. The image of the photographic plate may then be rotated about the axis of linear motion by operation of the milled head corresponding to 65, Figure 12. By sliding the base 98 about on the surface of the table and adjusting the rod 96 vertically, with the screws 99 and 100 loosened, a position may be found for the projection camera from which a coincidence may be established between the projected and plotted triangles with correct perspective, in a manner precisely analogous to that adopted in the second method, previously described. The clamping screws 99 and 100 are now tightened, and, without disturbing the position of the heavy base 98, the tube 84 is disengaged from the pins 85. The tube corresponding to 84 of another identical projection camera is now connected to the pins 85, and this second camera containing the second photographic plate put through a procedure similar to that described for the first projection camera to obtain a coincidence between the plotted control triangle of the second photograph triangle and the image of the same control triangle, projected from the second photograph. The clamping screws in the second camera corresponding to 99 and 100 are then tightened, and the tube corresponding to 84 disengaged from the pins 85. The standards 75, ring 77, and screen 78 are now removed, and a horizontal screen substituted in their place, the height of this screen relative to the height of the centre of the screen 78 being as $z_r : z_c$, measured to the scale $1/N$, using the same notation as that adopted in Equations XII.

If now the images from the two projection cameras are alternately cast on the horizontal screen, the plane-of-reference projections of the two photographic plates will be obtained correctly located with respect to each other. The aircraft positions corresponding to $P_1$ and $P_2$, Figure 1, can be determined by plumb bobs let fall to the horizontal screen so as to indicate the vertical projections of the external principal points of the lenses of the two projection cameras, and the heights of the points $P_1$ and $P_2$, Figure 1, above the plane of reference may be determined by direct measurement of the heights of the external principal points of the lenses of the two projection cameras above the horizontal screen, the heights thus measured being the heights $P_1' - P_1$ and $P_2' - P_2$, Figure 1, to the scale $1/N$. The region common to the two photographs may now be mapped by the methods already described in dealing with any two plane-of-reference projections correctly located with respect to each other.

The advantage of this method is that no calculations are required to ascertain the aircraft position, and so it may prove the quickest means of setting up the projections so as to secure the data for the map. It does not appear however that apparatus constructed on this principle would be as accurate as that previously described. But this type of apparatus may prove very valuable for military and other purposes where speed is more essential than minute accuracy in the maps produced.

It is to be noted that although the aircraft position may be determined in the manner described, it may also be calculated from the scale readings of the apparatus. Thus if D is the distance from the external principal point of the projection lens, read on the linear scale on the tube 84, $\varphi$ the angular displacement of the tubes 84 from the line 89—90, Figure 17, $\theta$ the angle read on the scale member 81, and $\eta$ the angle read on the scale member 82, the coordinates of the aircraft position are given by the formulas XII''. $x_p = x_c + ND [\sin \varphi \cos \mu + \cos \varphi \sin \theta \sin \mu]$
$y_p = y_c + ND [\sin \varphi \sin \mu + \cos \varphi \sin \theta \cos \mu]$
$z_p = z_c + ND \cos \varphi \cos \theta$ the notation being the same as that adopted in Equations XII'. The convention with regard to signs may be established in the same general way as before.

A discussion of the accuracy and sources of error of the method of mapping herein disclosed is not called for here, but it may be remarked that with perfectly constructed apparatus and perfect manipulation the errors will depend entirely on the lenses employed and the sharpness of definition in the plates. The condition which the lenses employed should satisfy is that of rectilinearity as between the terrain photographed and the projected images of the plate. The wider the angle of field over which the lenses satisfy this condition, the more accurate and satisfactory will the method be. In practice a double lens in which the two principal points coincide will probably be found to be the most satisfactory type to employ. It is preferable also to have the photographs taken from the aircraft with a camera fitted with a 'between lens' shutter, rather than a focal plane shutter, as it is advisable to have all parts of the photographic plate exposed at the same instant.

With regard to the apparatus best adapted to carry out this method, the general type and arrangement shown in Figures 3 and 4 and 10 to 14 will prove satisfactory. It should be of rigid construction, all movements should be provided with fine adjustments, and there should be means provided for effecting all preliminary and zero adjustments. The design of the details of such an apparatus will present no difficulties to any experienced designer of surveying instruments, so it will not be dealt with here.

It will prove advantageous to have the screen mount fixed rigidly to the rails, and to effect the linear adjustment of the apparatus by having the projection camera moved backwards and forwards on the rails. If in addition means are provided for enabling all adjustments to be made by the operator while seated on the side of the screen remote from the camera this will prove a great advantage, as the operator will be able to watch the projected triangle during the process of making all the adjustments, which will result in greater speed and accuracy of manipulation.

Instead of using a ground glass plotting screen 26, the plotting screen may with advantage be made in the skeleton form shown in Figure 24. The rectangular frame 101, the circle 102, and the cross-piece 103 are made in one metal casting. Two arms 104 and 105 are capable of rotation about the screen centre 106, and are supplied with pointers cooperating with circular scales on the circle 102 so arranged that the angular positions of the arms 104 and 105 with respect to the cross-piece 103 may be determined. Four sliding pieces 107, 108, 109, and 110 have attached to them targets 111, 112, 113, and 114, consisting of ground glass discs with crosses engraved on their surfaces. A similar target is rigidly fixed at the screen centre 106. The five crosses on these targets are all in the same plane, which by adjustment coincides with the plane of the ends of the four screw stops 115. Linear scales engraved on the arms 104 and 105 and on the cross-piece 103, cooperating with pointers on the sliding pieces 107, 108, 109, and 110 enable the distances of the targets 111, 112, 113, and 114 from the screen centre to be read directly.

Triangles can be plotted rapidly and accurately with this skeleton screen in a perfectly obvious manner. If the first method of plotting the control triangle be adopted, it will be necessary to calculate the length of the sides of the control triangle joining the intermediate point to the other two points of the triangle, and to calculate the angle subtended by the high and the low points at the intermediate point. In plotting, the intermediate point is taken at the screen centre 106, the high point is plotted with the target 111 if screen is placed with far side facing camera and the low point is plotted with one of the targets 113 or 114 depending upon whether the triangle is positive or negative. If the second method of plotting the control triangle is adopted, it will be necessary to calculate the distance of the intermediate point from the high point, the low point, and the mid point, and to calculate the angles included by the mid line and the two adjacent sides of the triangle. These calculations are made in an obvious way. As before, the intermediate point is taken at the screen centre, the mid point is plotted with the target 111, and the high and the low points with the targets 113 and 114. The target 112 is supplied in case other conventions with regard to the plotting of the control triangles should be found more convenient.

A practical method of employing the positives of the plane-of-reference projections in the process of locating map positions and determining heights will now be described. (See Figures 15, 16 and 20 to 23.) A sheet of transparent paper 150 is pasted on one side of a sheet of plate glass 151 and this glass is placed, paper side up, so as to be over an aperture cut in the top of a table 152. Suppose now that positives of the plane-of-reference projections of the photographic plates $G_1$ and $G_2$, Figure 1 have been obtained, and are to be used for obtaining map data. On the papered side of the plate glass the points $P_1'$ $A_1'$ $B_1'$ $C_1'$ $P_2'$ $A_2'$ $B_2'$ $C_2'$, Figure 1, are plotted to the scale 1/N. A lens 153 is mounted beneath the glass 151 with its axis vertical, and at a distance from the paper equal to twice the focal length of the lens. Immediately beneath the lens 153 a right angled prism 154, having its smaller faces silvered, is placed with its large face horizontal as shown in Figure 21. Two projection cameras $155_1$ and $155_2$ are placed as indicated, so that the light from these cameras will fall on the silvered surfaces of the prism and be reflected up through the lens 153 and brought to a focus on the paper 150, the lengths of the paths of the rays from the projection cameras to the lens being equal to the distance of the lens from the paper. The positives are now mounted in the projection cameras and held in position by spring clips so arranged that these positives may be shifted about and oriented into any position. The positive obtained from the plate $G_1$ is now mounted in the camera $155_1$ and shifted about until the projected images of the objects A B C, Figure 1, coincide with the plotted points $A_1'$ $B_1'$ $C_1'$ on the paper 150, and the positive obtained from the plate $G_2$, mounted in the camera $155_2$ is similarly adjusted by means of a coincidence with the plotted points $A_2'$ $B_2'$ $C_2'$. On switching on the lights in the two projection cameras $155_1$ and $155_2$ in succession, an operator looking down on the paper 150 will be enabled to locate the two images $W_1'$ and $W_2'$, Figure 1, of an object such as W. By means of lines drawn from the plotted points $P_1'$ and $P_2'$ the map position and height of W may be determined as previously described.

If the two photographs include many objects whose positions are to be determined the process of drawing lines from $P_1'$ and $P_2'$ will be tiresome and slow. A method of optically projecting two straight lines on the paper 150 so placed that they pass through the plotted points $P_1'$ and $P_1'$ respectively and may be rotated about these points will prove more convenient and rapid. A practical way of accomplishing this is to have two other projection cameras $156_1$ and $156_2$ mounted similarly to the cameras $155_1$ and $155_2$, at right angles to $155_1$ and $155_2$, arranged to project images on the paper 150 by means of a second lens 157 and silvered prism 158, as shown in Figure 22, a plan of the general arrangement. Two circular glass plates 162 Figures 15 and 16 with straight lines and scales similar to that shown in Figure 23, are prepared. The zero of the scale is at 159, and the divisions of the scale are so arranged that the ratio of the distance from the zero of any division on the scale to the distance from the zero of the next division on the scale is constant for all parts of the scale. The scale is in fact an antilogarithmic scale. These two scales are mounted in circular rings 160 set in rectangular frames 161 (see Figures 15 and 16), the rings and plates being capable of rotation within the frames. The zeros of the scales are placed at the centres of the rings, as shown in Figure 15 so that the position of the zero will not shift as the ring is rotated. These two scales in their frames 161 are mounted in the two cameras $156_1$ and $156_2$ with spring clips 163 bearing on the frames and holding them against the glass supports 164 of the projection cameras, and the two frames are shifted about until the projected image of the zero of the scale of the plate in camera $156_1$ coincides with the plotted point $P_1'$ and the zero of the projected image of the other scale coincides with $P_2'$. The two frames are then retained in this position by the spring clips.

The scales are used as follows. The cameras $155_1$ and $156_1$ are switched on and the ring 160 holding the plate $156_1$ is rotated until the line of the projected scale passes through the image $W_1'$ of an unknown object W. Cameras $155_1$ and $156_1$ are switched off, $155_2$ and $156_2$ are switched on, and the line of the scale projected by $156_2$ is rotated by means of the ring mount until the projected line of the scale passes through the position $W_2'$ of the image of the unknown object W. Camera $155_2$ is now switched off, camera $156_1$ switched on, and the point of intersection of the lines of the two projected scales will indicate the map position $W_0$ of the object W, (Figure 20). The height $W_0-W$ may be determined by reading the number of scale divisions between $W_0$ and $W_1'$ on the scale radiating from $P_1'$ or the number of scale divisions between $W_0$ and $W_2'$ on the scale radiating from $P_2'$. If on the scale projected by the camera $156_1$ the ratio of the distances of successive divisions from the zero is R, if $H_1$ is the height $P_1'-P_1$, Figure 1, and $n_1$ is the number of scale divisions included between the image $W_1'$ and $W_0$, then the heights $W_0-W$ is equal to $H_1(1-1/R^n)$. When $n_1$ is small, and when a finely divided scale is used in which R is very nearly equal to 1, this expression is very approximately equal to $n_1 H_1 (R-1)$, so that the height may be taken as equal to the number of scale divisions multiplied by a constant which may be determined from the known values of $H_1$ and $R$. The approximate height as read on the scale radiating from $P_2'$ will of course be $n_2 H_2 (R-1)$, assuming the two scales have the same ratio constant $R$. For reading heights which are too great for this approximate formula $nH(R-1)$ to be sufficiently accurate, a table may be prepared by calculation giving corresponding values of $n$ and $(1-1/R^n)$. To obtain the correct height, $n$ is read on the scale, the corresponding value of $(1-1/R^n)$ is looked up on the table of values, and this quantity multiplied by $H$, a constant for the photograph, gives the true height.

It is to be noted that if the working projections of the photographs are formed by rays which have passed through a sheet of plate glass, such as 151, there will be a certain amount of distortion due to the refraction of the glass. This distortion may be neutralized by projecting the image of the finished map, drawn on the paper 150, by means of a projection lens placed at the same position with respect to the paper 150 as the lens 153.

The underlying principles of the foregoing method of mapping correspond closely with the fundamental principles of plane surveying. The plane surveyor in effect imagines himself at the centre of a large sphere and observes with his instruments the positions of objects in nature centrally projected from his own position on the surface of this sphere. By means of the horizontal angular separation of the projected images of objects in nature he is able to determine bearings, while the angles of elevation of the projections of objects as seen from his position supply him with data for estimating heights. In the method of survey described in this paper the surveyor imagines himself at some height above an infinite horizontal plane of reference. From his point of sight he takes observations on the horizontal angular separation of the positions of objects in nature centrally projected from his position on this plane of reference, and from these observations determines bearings; while the radial displacements of the projected positions of objects from their orthogonally projected positions on this plane supply him with data for estimating their heights.

The main difficulty of the air surveyor is to determine his position and to obtain his horizontal central projection. The present invention provides a method of accomplishing these two results.

It is obvious that the present invention may be employed in any problem where the spacial configuration of objects photographed is to be determined, provided the triangle formed by three objects appearing in each photograph can be located in space. In applying the method the orthogonal projections of these three objects on any convenient plane of reference are calculated and also the distance of each object from this plane of reference, which may be horizontal or vertical, or inclined at any angle to the horizontal, as best suited to the conditions of the particular problem. By applying the methods above described the orthogonal projections on this plane of reference and the distance from this plane of reference of all objects common to the two photographs may be determined. The method is thus suitable to problems of determining the dimensions of building, fortifications, engineering structures, ruins, mines, etc., etc., and the claims are to be taken as referring to such applications of the method, and not alone as referring to the problem of surveying. The specification describes the method as applied to the problem of surveying merely because this constitutes a concrete and important application of the method.

While I have described in detail certain preferred procedures to be followed in practicing my invention which I have found to be convenient and practicable, and while I have illustrated and described in detail certain forms of apparatus which I have found well adapted to carrying out the required operations, I do not wish to be understood as limiting myself to the performance of the process by the exact steps or the following of the particular sequence of operations, or by the use of the particular apparatus as herein set forth, as I realize that changes both in procedure and in the apparatus are possible. I therefore intend to claim my invention broadly in whatever manner its principle may be made use of.

Having thus described my invention, I claim:—

1. The method of determining relative configuration which consists in taking from different points two photographs of the objects, the configuration of which is to be determined, producing central projections of said photographs geometrically similar to the two central projections on a single plane in nature of the objects shown in said photographs from the respective camera positions as centers of projection, determining the centers of vision of said two produced central projections, and using said two produced central projections in conjunction to locate objects appearing in both of said produced projections by means of the relative configuration in each of said produced projections of the center of vision, the images of objects whose position in nature is known, and the images of the objects to be located.

2. The method of determining relative configuration which consists in taking from different points two photographs of the objects, the configuration of which is to be determined, producing central projections of said photographs geometrically similar to the two central projections on a single plane in nature of the objects shown in said photographs from the respective camera positions as centers of projection, determining the centers of vision and centers of projection of said two produced central projections, and using said two produced central projections in conjunction to locate objects appearing in both of said produced projections by means of the relative configuration in each of said produced projections of the center of vision, the center of projection, the images of objects whose position in nature is known, and the images of the objects to be located.

3. The method of determining relative configuration which consists in taking from different points two photographs of the objects, the configuration of which is to be determined, producing central projections of said photographs geometrically similar to the two central projections on a single plane in nature of the objects shown in said photographs from the respective camera positions as centers of projection, and using said produced central projections in conjunction to locate objects shown in said produced central projections.

4. The method of determining relative configuration which consists in taking from different points two photographs of the objects the configuration of which is to be determined, producing central projections of said photographs geometrically similar to the two central projections on a single plane in nature of the objects shown in said photographs from the respective camera positions as centers of projection, locating said produced central projections of said photographs in the same relationship to each other as the relationship to each other of the said central projections in nature, and determining spacial locations of the intersections of pairs of lines situated with respect to said located produced central projections similarly to the location with respect to the said central projections in nature of pairs of lines connecting the two camera positions in nature to objects appearing in both of said photographs, the configuration of which objects is to be determined.

5. The method of determining relative configuration which consists in taking from different points two photographs of the objects the configuration of which is to be determined, producing central projections of said photographs geometrically similar to the two central projections on a single plane in nature of the objects shown in said photographs from the respective camera positions as centers of projection, locating said produced central projections of said photographs in the same relationship to each other as the relationship to each other of the said central projections in nature, and determining orthogonal projections on a single plane of the intersections of pairs of lines situated with respect to said located produced central projections similarly to the location with respect to the said central projections in nature of pairs of lines connecting the two camera positions in nature to objects appearing in both of said photographs, the configuration of which objects is to be determined.

6. The method of determining relative configuration which consists in taking from different points two photographs of the objects the configuration of which is to be determined, producing central projections of said photographs geometrically similar to the two central projections on a single plane in nature of the objects shown in said photographs from the respective camera positions as centers of projection, locating said produced central projections of said photographs in the same relationship to each other as the said central projections in nature, and determining spacial locations and orthogonal projections on a single plane of the intersections of pairs of lines situated with respect to said located produced central projections similarly to the location with respect to the said central projections in nature of pairs of lines connecting the two camera positions in nature to objects appearing in both of said photographs, the configuration of which objects is to be determined.

7. The method of determining relative configuration which consists in taking from different points two photographs of the objects the configuration of which is to be determined, producing central projections of said photographs geometrically similar to the two central projections on a single plane in nature of the objects shown in said photographs from the respective camera positions as centers of projection, locating said produced central projections of said photographs in the same relationship to each other as the said central projections in nature, and determining spacial locations of the intersections of pairs of lines respectively joining each of the two images of an object appearing in said located produced central projections to the center of projection of the located central projection in which such image occurs.

8. The method of determining relative configuration which consists in taking from different points two photographs of the objects the configuration of which is to be determined, producing central projections of said photographs geometrically similar to the two central projections on a single plane in nature of the objects shown in said photographs from the respective camera positions as centers of projection, locating said produced central projections of said photographs in the same relationship to each other as the said central projections in nature, and determining locations of the intersections of orthogonal projections on a single plane of pairs of lines respectively joining each of the two images of an object appearing in said located produced central projections to the center of projection of the located central projection in which such image occurs.

9. The steps in the method of determining spacial configuration which consist in taking a photograph of an area the configuration of which is to be determined, projecting said photograph with the aid of a projection center located in the same position relative to the photograph as that of the center of projection of the rays which formed the photographic image during exposure bore to said image at the instant of exposure, and effecting a coincidence between the projections of images of a plurality of objects appearing on the photograph and points arranged to correspond with the spacial arrangement of said objects in nature.

10. The steps in the method of determining relative configuration which consist in taking a photograph of the objects the configuration of which is to be determined, placing a plurality of points in the same spacial relation as the spacial relation of certain objects in nature appearing in said photograph, placing said photograph in projection apparatus, locating the internal principal point of the projection lens of said apparatus in the same relation to the photograph as that which existed between the internal principal point of the photographic objective and the photograph at the time of exposure, and locating the external principal point of said projection lens in the same relation to said placed points that the external principal point of said photographic objective occupied with respect to the corresponding objects in nature at the instant said photograph was exposed.

11. The method of determining relative configuration which consists in taking from different points two photographs of the objects the configuration of which is to be determined, placing a plurality of points in the same relative configuration as the spacial configuration of certain objects in nature appearing in one of said photographs, placing said photograph in projection apparatus, locating the external principal point of the lens of said projection apparatus in the same relation to said placed points that the external principal point of the lens of the camera with which said photograph was taken occupied with respect to the corresponding objects in nature at the instant said photograph was exposed, centrally projecting said photographs by said apparatus on a plane of reference, and using said projections in conjunction to locate objects appearing in both said projections, by means of the relative configuration in each of said projections of the images of objects whose position in nature is known and the images of the objects to be located.

12. The method of determining relative configuration which comprises utilizing a plurality of photographs showing known objects and which also show an object the location of which is to be determined, ascertaining from data contained in said plurality of photographs and data concerning the position of said known points the spacial position in nature from which said photographs were exposed, and using in conjunction the different relative configurations of the images appearing in said photographs of the object the location of which is to be determined and the images of the known objects to determine the location of said object with reference to said known objects.

13. The method of determining relative configuration consisting in taking from different points two photographs of the objects the configuration of which is to be determined, each photograph also showing three points the location of which in space is known, reproducing the known points to a known scale in their actual spacial relationship, placing each of said photographs in projection apparatus, procuring a coincidence between the projected images of the known points and the scale reproductions of the known points, producing central projections of said two photographs similar to the central projections in nature of the objects shown in said photographs projected on a single plane in nature from the camera positions at the instants of exposures as projection centers, locating said produced central projections on a single plane in the same relationship to each other as the relationship to each other of the corresponding central projections in nature on the said single plane, and using in conjunction the two said located produced central projections to determine the relative configuration of objects shown in both of said photographs.

14. The method of determining relative configuration consisting in taking from different points two photographs of the objects the configuration of which is to be determined, each photograph also showing three points the location of which in space is known, reproducing the known points to a known scale in their actual spacial relationship, placing each of said photographs in projection apparatus, procuring a coincidence between the projected images of the known points and the scale reproductions of the known points, producing central projections of said two photographs similar to the central projections in nature of the objects shown in said photographs projected on a single plane in nature from the camera positions at the instants of exposures as projection centers, locating said produced central projections on a single plane in the same relationship to each other as the relationship to each other of the corresponding central projections in nature on the said single plane, locating the centers of projection and centers of vision of said located produced central projections, producing a line on each of said located produced central projections connecting the image of an object the position of which is to be determined with the center of vision of the located produced central projection in which said image appears, the intersection of which two lines in relation to the intersections of lines similarly drawn from the centers of vision to the images of the known points in the located produced central projections determines the orthogonal projection of the unknown object in nature on the said single plane in relation to the corresponding orthogonal projections of the known points.

15. The method of determining relative configuration consisting in taking from different points two photographs of the objects the configuration of which is to be determined, each photograph also showing three points the location of which in space is known, reproducing the known points to a known scale in their actual spacial relationship, placing each of said photographs in projection apparatus, procuring a coincidence between the projected images of the known points and the scale reproductions of the known points, producing central projections of said two photographs similar to the central projections in nature of the objects shown in said photographs projected on a single plane in nature from the camera positions at the instants of exposure as projection centers, locating said produced central projections on a single plane in the same relationship to each other as the relationship to each other of the corresponding central projections in nature on the said single plane, locating the centers of projection and centers of vision of said located produced central projections, producing a line on each of said located produced central projections connecting the image of an object the position of which is to be determined with the center of vision of the located produced central produced central projection in which said image appears, the intersection of which two lines in relation to the intersections of lines similarly drawn from the centers of vision to the images of the known points in the located produced central projections determines the orthogonal projection of the unknown objects in nature on the said single plane in relation to the corresponding orthogonal projections of the known points, the distance of said unknown object from said single plane in nature being determined by the distance of the image of said object in one of the located central projections from the said intersection of lines drawn to the two images of said object, the distance of said image from the center of vision of the located central projection in which said image occurs, the distance between the center of projection and the center of vision of said located central projection, and the scale of the said reproduced known points relative to the scale of nature.

16. The method of determining relative configuration which consists in taking from different points two photographs of the objects the configuration of which is to be determined, placing a plurality of points in the same relative configuration as the spacial configuration in nature of certain objects appearing in one of said photographs, placing said photograph in projection apparatus in which the relation between lens axis, internal principal point of lens, and photograph is the same as that which existed at the instant of exposure in the camera with which said photograph was exposed, procuring a coincidence between projected images of the said certain objects and the said placed plurality of points, and projecting by means of said projection apparatus the photograph on a surface of which the angular position with respect to the projection apparatus is the same as that which would be produced by effecting relative rotation between said projection apparatus and the plane of said placed plurality of points after said coincidence has been procured, said relative rotation being through an angle equal to the dihedral angle included between the plane of said certain objects and a known plane in nature.

17. The method of determining relative configuration which consists in taking from different points two photographs of the objects the configuration of which is to be determined, placing a plurality of points in the same relative configuration as the spacial configuration in nature of certain objects appearing in one of said photographs, placing said photograph in projection apparatus in which the relation between lens axis, internal principal point of lens, and photograph is the same as that which existed at the instant of exposure in the camera with which said photograph was exposed, procuring a coincidence between projected images of the said certain objects and the said placed plurality of points, and projecting by means of said projection apparatus the photograph on a surface of which the angular position with respect to the projection apparatus is the same as that which would be produced by effecting relative rotation between said projection apparatus and the plane of said placed plurality of points after said coincidence has been procured, said relative rotation being through an agle equal to the dihedral angle included between the plane of said certain objects and a known plane in nature, said relative rotation occurring about an axis in the plane of said placed plurality of points, the orientation of said axis with respect to said placed plurality of points being the same as the orientation with respect to said certain objects in nature of the line of intersection of the plane of said certain objects with the said known plane in nature.

18. The steps in the method of determining the distance from a specified plane in nature of an unknown point in nature shown in a photograph which consist in centrally projecting the image of said point in the photograph upon a plane corresponding to said specified plane in nature, said projection being similar to the central projection in nature of the objects shown in said photograph from the camera position as projection center upon the said specified plane in nature, and determining the displacement of said projected image by measuring the distance from said projected image to the point on said produced central projection corresponding to the orthogonal projection of the said unknown point on the said plane corresponding to said plane in nature.

19. In a method of determining relative configuration by means of photographs the steps which consist in taking two photographs from different points each showing common objects, placing each photograph in projection apparatus, projecting each photograph on a screen, and producing relative adjustments between projection apparatus and screen whereby the plane of the screen is brought into the same relation to the optical axis of the projection apparatus that the plane including three specified points in nature occupied with respect to the optical axis of the camera at the instant the photograph was exposed.

20. In a method of determining spacial configuration by means of photographs, the steps which consist in taking a photograph which includes three objects of which the positions in space are known, placing three points to form a triangle similar to the triangle formed by said three objects in space, placing said photograph in projection apparatus, and procuring a coincidence between projected images of the three known objects and the said three placed points.

21. In a method of determining spacial configuration by means of photographs, the steps which consist in taking a photograph which includes three objects of which the positions in space are known, placing three points to form a triangle similar to the triangle in space formed by said three objects, placing said photograph in projection apparatus in which the relation between lens axis, internal principal point of lens and photograph is the same as that which existed at the instant of exposure in the camera with which said photograph was exposed, and procuring a coincidence between projected images of said three objects and said three placed points.

22. In a method of determining spacial configuration by means of photographs, the steps which consist in taking a photograph which includes three objects of which the positions in space are known, placing three points to form a triangle similar to the triangle formed by said three objects in space, placing said photograph in projection apparatus, procuring a coincidence between projected images of the three known objects and the said three placed points, and determining the position in nature from which said photograph was exposed by procedure based on the assumption that the relative configuration of the said three placed points and the external principal point of the lens of the said projection apparatus is similar to the relative configuration of the said three objects in nature and the position in nature from which said photograph was exposed.

23. In a method of determining spacial configuration by means of photographs, the steps which consist in taking a photograph which includes three objects of which the positions in space are known, placing three points to form a triangle similar to the triangle in space formed by said three objects, placing said photograph in projection apparatus in which the relation between lens axis, internal principal point of lens and photograph is the same as that which existed at the instant of exposure in the camera with which said photograph was exposed, procuring a coincidence between projected images of said three objects and said three placed points, and determining the position in nature from which said photograph was exposed by procedure based on the assumption that the relative configuration of the said three placed points and the external principal point of the lens of the said projection apparatus is similar to the relative configuration of the said three objects in nature and the position in nature from which said photograph was exposed.

24. In a method of locating objects shown in two photographs the steps which comprise producing central projections of said photographs similar to the central projections in nature of the objects included in said photographs on a single plane in nature from the camera positions as projection centers; and using said produced central projections in conjunction to determine the location of objects shown in said photographs.

25. The method of determining relative configuration consisting in taking from different points two photographs of the objects the configuration of which is to be determined, each photograph also showing three points the exact location of which in space is known, reproducing the known points to a known scale in their actual spacial relationship, placing each of said photographs in projection apparatus, procuring a coincidence between the projected images of the known points and the scale reproductions of the known points, producing central projections of said two photographs similar to the central projections in nature of the objects shown in said photographs projected on a single plane in nature from the camera positions at the instants of exposures as projection centers, locating said produced central projections on a single plane in the same relationship to each other as the relationship to each other of the corresponding central projections in nature on the said single plane in nature, locating the centers of projection and centers of vision of said located produced central projections, and determining the orthogonal projections of said unlocated objects on said single plane in nature by means of the intersections of lines located on said located produced central projections, the positions of said located lines corresponding with the positions in nature of the orthogonal projections on the said single plane in nature of rays joining the camera positions at the instant of exposing the photographs to the unknown objects.

26. The method of determining relative configuration consisting in taking from different points two photographs of the objects the configuration of which is to be determined, each photograph also showing three points the exact location of which in space is known, reproducing the known points to a known scale in their actual spacial relationship, placing each of said photographs in projection apparatus, procuring a coincidence between the projected images of the known points and the scale reproductions of the known points, producing central projections of said two photographs similar to the central projections in nature of the objects shown in said photographs projected on a single plane in nature from the camera positions at the instants of exposures as projection centers, locating said produced central projections on a single plane in the same relationship to each other as the relationship to each other of the corresponding central projections in nature on the said single plane, locating the centers of projection and centers of vision of said located produced central projections, and determining the orthogonal projections of said unlocated objects on said single plane in nature by means of the intersections of lines located on said located produced central projections, the positions of said located lines corresponding with the positions in nature of the orthogonal projections on the said single plane of rays joining the camera positions at the instant of exposing the photographs to the unknown objects, and determining the distances of the unlocated objects from the said plane in nature by calculation based on the displacements of the images of said unlocated objects in the said located central projections measured from the intersection of the corresponding pairs of said located lines, the distance of one of the images of each of said unlocated objects from the center of vision of the located central projection in which said image appears, the distance between the center of projection and the center of vision of the said located central projection, and the scale of the reproduced known points relative to the scale of nature.

27. In a method of producing coincidence between the image of a photograph including certain known points projected on a screen and points plotted on the screen corresponding to the known points of the photograph, the steps which consist in effecting a preliminary adjustment by moving the projection apparatus relative to the screen and then moving the screen relative to the projection apparatus until coincidence is secured.

28. In a method of producing coincidence between the images of certain points included in a photograph projected on a screen and points placed on the screen corresponding to said certain points of the photograph, the steps which consist in adjusting the projection apparatus until the image of one of the points of the photograph is brought into coincidence with the corresponding point placed on the screen, and then effecting relative adjustment between the screen and the projection apparatus without destroying said coincidence until further coincidences are secured between the remaining images and points placed on the screen.

29. In a method of producing coincidence between the images of certain points included in a photograph projected on a screen and points placed on the screen to correspond to said certain points of the photograph, the steps which consist in adjusting the projection apparatus until coincidence is secured between the projected image of one of the said points of the photograph and the point placed on the screen to correspond to the said point of the photograph, and then securing coincidence between the remaining images and plotted points by varying the distance between the projection apparatus and screen and by tilting the screen about two axes intersecting in the screen surface.

30. In a method of determining spacial configuration by means of photographs, the step which consists in procuring coincidence between three points plotted on a screen and the images of three objects appearing in a photograph projected on the screen by means of a projection apparatus in which the photograph is mounted in the same relationship to the lens of the projection apparatus that the plate and lens in the photograph camera occupied at the instant of exposure.

31. The step in the method of determining spacial configuration which consists in taking two photographs from different positions, each photograph showing at least three objects the position of which in space is known and each showing the area or object, the configuration of which is to be determined, the relative position of the lens and plate at the time each photograph is taken being known, and performing the following steps with each photograph:—(1) the photograph is mounted in a projection camera in which the relative configuration of lens position and plate corresponds with that of the camera with which the photograph was taken; (2) a triangle is plotted which is a reproduction to scale of some control triangle in nature which is fixed by three of the known points appearing in the photograph; (3) a coincidence is effected between the image of the control triangle projected by the camera and the plotted triangle; (4) allowance being made for any lack of horizontality of the control triangle in nature, the angular and spacial position of the camera at the time the photograph was taken is calculated and also the station point corresponding with the orthogonal projection of the camera position upon a plane of reference.

32. A method of determining spacial configuration which consists in taking two photographs from different positions, each photograph showing at least three objects the position of which in space is known and each showing the area or object, the configuration of which is to be determined, the relative position of the lens and plate at the time each photograph is taken being known, and performing the following steps with each photograph:—(1) the photograph is mounted in a projection camera in which the relative configuration of lens position and plate corresponds with that of the camera with which the photograph was taken; (2) a triangle is plotted which is a reproduction to scale of some control triangle in nature which is fixed by three of the known points appearing in the photograph; (3) a coincidence is effected between the image of the control triangle projected by the camera and the plotted triangle; (4) allowance being made for any lack of horizontality of the control triangle in nature, the position of the camera at the time the photograph was taken is calculated and also the station point corresponding with the orthogonal projection of the camera position upon a plane of reference; (5) a plane-of-reference projection of the photograph is obtained; (6) the station point and the calculated position of the control triangle in the plane-of-reference projection are plotted on a mapping surface; (7) the plane-of-reference projection of the photograph is transferred to the mapping surface and located there by means of the triangle plotted in the last-mentioned operation; (8) in conjunction with the plane-of-reference projection of the other photograph similarly treated, the map positions of objects appearing in both photographs are found by locating the intersection of lines drawn to the two images of each object from the station point of the projection in which each occurs; the heights of the objects in the photographs are determined by calculation based on the displacement of one image of each object from its map position, the distance of said image of each object from the station point of the projection in which it occurs and the height of the camera position above this station point.

33. In a method of determining the positions of objects shown in each of a pair of photographs by means of projections of such photographs similar to specified projections in nature of the objects shown in such photographs, said photographs having been taken from different camera positions on different axes, the step which consists in alternately projecting such projections on the same portion of a plane surface.

34. In a method of determining the position of objects shown in each of a pair of photographs by means of projections of such photographs, the steps which consist in optically projecting alternately a plurality of such projections on the same portion of a plane surface and also optically projecting reference lines on said surface.

35. In a method of determining the positions of objects shown in each of a pair of photographs by means of projections of such photographs, the steps which consist in optically projecting such projections on a surface and also optically projecting reference lines divided into anti-logarithmic scales on said surface.

36. The steps in the method of determining spacial configuration which consist in taking from different points two photographs of the area the configuration of which is to be determined, placing the photographs in projection apparatus, locating the projection apparatus in the same relation to three specified points on a screen that the camera by which the original photograph was taken, occupied with respect to three points in the area photographed, and centrally projecting each of said photographs by said apparatus on a single plane of reference.

37. The steps in the method of determining spacial configuration which consist in taking a photograph of the area the configuration of which is to be determined, placing the photograph in projection apparatus, locating said apparatus in the same relation to three placed points that the camera by which the original photograph was taken occupied with respect to three corresponding points in the area photographed, and centrally projecting said photograph by said apparatus on a plane of reference.

38. The method of determining spacial configuration by means of photographs which consists in taking from different positions two photographs in each of which are shown the objects to be located and also three objects, the positions of which in space relative to a chosen system of coordinates are ascertainable by independent means, placing each of said photographs in projection apparatus in which the position of the photograph relative to the projection lens corresponds with the relative position of the photograph and the camera lens at the time the corresponding photograph was taken, plotting a triangle geometrically similar to that formed by the three ascertainable objects in their own plane in nature, effecting optical coincidence for each of said photographs between the projected images of said ascertainable points and the corresponding points of said plotted triangle; maintaining the relation between photograph and projection lens as specified, obtaining and preferably photographically recording a datum projection on a plane surface of which the angular position relative to the plane of the photograph differs from the angular position of the plane of the plotted triangle relative to the plane of the said photograph when the aforesaid optical coincidence was effected by an angle corresponding to the dihedral angle in nature included between the plane of the said ascertainable points and a chosen datum plane, determining the camera position in nature from which each photograph was taken by procedure based on the assumption that the tetrahedron formed in nature by the said camera position and the said three ascertainable points is geometrically similar to the tetrahedron formed by a definite point on the axis of the projection lens and the three said plotted points when the aforesaid optical coincidence was effected, and employing in conjunction the two datum projections thus obtained, the camera positions, the scale of the plotted triangle and the centers of vision of the two datum projections to determine the spacial configuration of the points to be located relative to the three objects the positions of which are ascertainable by independent means.

39. The method as set forth in claim 38, in which the two datum projections are employed in conjunction by locating the two said datum projections on a surface in positions with respect to each other geometrically similar to the locations with respect to each other of the projections in nature from the corresponding camera position of the object included in the photographs on a single corresponding datum plane, and determining the spacial relationship in nature of the said known and unknown objects by procedure involving the centers of vision of said projections located on said surface, the scale of the said located projections relative to the scale of the corresponding projections in nature, the distances of corresponding camera positions from the said corresponding datum plane in nature, and the positions on the said surface of the two images of each of the objects to be spatially located.

40. The step in the method as set forth in claim 38, which consists in mounting the plotted triangle in supporting apparatus and rotating it independently about a plurality of axes intersecting in one of the points forming the said triangle to effect the desired optical coincidence between the plotted points and the projected images of the three ascertainable points shown in the photograph.

41. The combination of a projection camera comprising a plate holder and lens, means whereby the holder and lens, as a unit, are mounted for angular adjustment about a plurality of intersecting axes, and an angularly adjustable projection screen.

42. The combination of a projection camera comprising a plate holder and lens, means whereby the holder and lens, as a unit, are mounted for angular adjustment about a plurality of axes intersecting at a point on the axis of the lens of said camera, and an angularly adjustable projection screen.

43. The combination of a projection camera comprising a plate holder and lens, means whereby the holder and lens, as a unit, are mounted for angular adjustment about a plurality of axes intersecting in one of the principal points of the lens of said camera, and an angularly adjustable projection screen.

44. The combination of a projection camera comprising a plate holder and lens, means whereby the holder and lens, as a unit, are mounted for angular adjustment about a plurality of intersecting axes, an angularly adjustable projection screen, and supporting means for said camera and screen permitting the distance between the two to be varied.

45. The combination of a projection camera comprising a plate holder and lens, means whereby the holder and lens, as a unit, are mounted for angular adjustment about a plurality of intersecting axes, an angularly adjustable projection screen, supporting means for said camera and screen permitting the distance between the two to be varied, and indicating means whereby variations in the distance between the two may be determined.

46. The combination of a projection camera comprising a plate holder and lens, means whereby the holder and lens, as a unit, are mounted for angular adjustment about a plurality of intersecting axes, a projection screen, supporting means for said camera and screen permitting the distance between the two to be varied, and indicating means whereby the distance between the two may be determined.

47. The combination of a projection camera comprising a plate holder and lens, means whereby the holder and lens, as a unit, are mounted for angular adjustment about a plurality of axes intersecting in a point, a projection screen mounted for angular adjustment about a plurality of axes intersecting in a point, supporting means for said camera and screen permitting the distance between the two to be varied, and indicating means whereby the distance between the point of intersection of the plurality of axes about which the camera is rotatable and the point of intersection of the plurality of axes about which the projection screen is rotatable may be determined.

48. The combination of a projection camera comprising a plate holder and lens, means whereby the holder and lens, as a unit, are mounted for angular adjustment about a plurality of intersecting axes, a projection screen mounted for angular adjustment about a plurality of intersecting axes, supporting means for said camera and screen permitting the distance between the two to be varied, and indicating means of which the indications depend upon the distance between the point of intersection of the plurality of axes about which the said camera is rotatable and the point of intersection of the plurality of axes about which the said projection screen is rotatable.

49. The combination of a projection camera comprising a plate holder and lens, means whereby the holder and lens, as a unit, are mounted for angular adjustment about a plurality of intersecting axes, a projection screen mounted for angular adjustment about a plurality of intersecting axes, supporting means for the camera and screen permitting movement whereby the distance between the two may be varied, such movement being linear and parallel to the line joining the point of intersection of the plurality of axes about which the said camera is rotatable to the point of intersection of the plurality of axes about which the said screen is rotatable.

50. The combination of a projection camera comprising a plate holder and lens, means whereby the holder and lens, as a unit, are mounted for angular adjustment about a plurality of intersecting axes, a projection screen mounted for angular adjustment about a plurality of intersecting axes, supporting means for said camera and screen permitting movement whereby the distance between the two may be varied, such movement being linear and parallel to one of the axes about which the said camera is rotatable.

51. The combination of a projection camera comprising a plate holder and lens, means whereby the holder and lens, as a unit, are mounted for angular adjustment about a plurality of intersecting axes, a projection screen mounted for angular adjustment about a plurality of intersecting axes, and supporting means for said camera and screen arranged so that the point of intersection of the plurality of axes about which the said screen is rotatable lies on one of the axes about which the said camera is rotatable.

52. The combination of a projection camera comprising a plate holder and lens, means whereby the holder and lens, as a unit, are mounted for rotation about a plurality of intersecting axes, a projection screen mounted for rotation about a plurality of intersecting axes, supporting means for said camera and screen whereby a linear relative movement between the two may be effected, said linear relative movement occurring parallel to the line joining the point of intersection of the plurality of axes about which the said camera is rotatable to the point of intersection of the plurality of axes about which the screen is rotatable, and indicating means whereby a plurality of adjustments of said apparatus may be determined.

53. The combination of a support, a supporting member carried thereby, and mounted to rotation about a longitudinal axis, a projection camera mounted in said member, said camera having a lens pivotally supported for movement about a plurality of axes intersecting in said longitudinal axis, and a projection screen movable about a plurality of axes intersecting at a point of the screen surface lying on the said longitudinal axis.

54. The combination of a support, a supporting member carried thereby, and mounted for rotation about a longitudinal axis, a projection camera mounted in said member, said camera having a lens supported for movement about a plurality of axes intersecting in said longitudinal axis, and a projection screen movable about a plurality of axes intersecting in a point of the screen surface lying on said longitudinal axis, said camera and screen being adjustable towards and from each other in the direction of the said longitudinal axis.

55. A projection camera movable as a unit about an axis passing through one of the principal points of the lens of said camera.

56. A projection camera movable as a unit about a plurality of axes intersecting in one of the principal points of the lens of said camera.

57. In apparatus of the character described a projection camera movable as a unit about two axes intersecting at right angles in one of the principal points of the lens, and rotatable about a third axis coinciding with the axis of the lens.

58. A projection apparatus including a lens capable of movement about two axes intersecting in one of the principal points of the lens and rotatable carrying means for the plate to be projected permitting said plate to be rotated about an axis intersecting the plate and passing through said principal point of the lens.

59. A projection camera having a lens, means for pivotally supporting said camera adjacent to said lens, and adjustable supporting means whereby the camera as a unit may be pivoted in any direction about a point on the axis of said lens.

60. A projection camera having a lens, means for pivotally supporting said camera adjacent to said lens, and adjustable supporting means whereby the camera as a unit may be pivoted about one of the principal points of said lens.

61. Projection apparatus comprising a cradle rotatable about an axis, means whereby the said member may be moved in the direction of the said axis and a projection camera carried by said cradle.

62. Projection apparatus comprising a cradle rotatable about a fixed horizontal axis, and a projection camera carried by said cradle.

63. Projection apparatus comprising a support, a cradle mounted on said support for rotation about an axis, and a projection camera adjustably carried by said cradle and movable about a plurality of axes intersecting in a point lying on the axis of rotation of said cradle.

64. Projection apparatus comprising a support, a cradle mounted on said support for rotation about an axis, and a projection camera adjustably carried by said cradle and movable about a plurality of axes intersecting in a point lying on the axis of rotation of said cradle, said point coinciding with one of the principal points of the lens of said camera.

65. In a projection apparatus of the character described, a projection camera including a lens and plate-carrying means, pivotal supporting means for the lens whereby the axis of the lens may be pointed into any desired direction, and means for focusing the camera by moving the plate-supporting means towards and from the lens.

66. Projection apparatus comprising a translucent surface, a lens mounted behind the same, a plurality of reflecting surfaces mounted behind said lens, and a plurality of projection cameras mounted opposite said reflecting surfaces, whereby the image from each of said cameras may be transmitted by one of said reflecting surfaces through the said lens and projected on said translucent surface from the rear.

67. Projection apparatus comprising a frame, a translucent plate rotatably mounted in said frame, and a line on said plate in alignment with the center of rotation of said plate, said line being divided into an antilogarithmic scale having its zero point at the center of rotation of the said plate.

68. Projection apparatus comprising a frame, a translucent plate rotatably mounted in the said frame, and a line on the said plate in alignment with the center of rotation of the said plate, said line being marked with scale divisions, the distances of successive scale divisions from the center of rotation of said plate being in geometrical progression.

69. The combination with a projection camera of a plate adjustably mounted therein, having a scale thereon, the distances of successive divisions of said scale from a fixed point being in geometrical progression.

70. Projection apparatus comprising a projection camera, a screen, supporting means for said camera and screen, mechanism permitting relative angular motion between said camera and screen about a plurality of axes intersecting in the optical axis of said camera, and also permitting of relative angular motion between said camera and screen about a plurality of axes intersecting in a point on the screen surface, and means permitting the distance between two said points of intersection of two said pluralities of axes to be varied.

71. In combination, a projection camera comprising a lens and plate, means for supporting the lens and plate in predetermined relative positions, and means for effecting angular adjustments of the lens and plate about a plurality of intersecting axes, said means being arranged to retain said relative position of the lens and plate undisturbed.

72. In combination, a projection camera comprising a lens and plate, means for supporting the lens and plate in predetermined relative positions, means for effecting angular adjustments of the lens and plate about a plurality of intersecting axes, said means being arranged to retain said relative position of the lens and plate undisturbed, and means for effecting movements of translation of said lens and plate, said means being arranged to retain the adjusted relative position of the lens and plate undisturbed.

73. In combination, a projection camera comprising a lens and a plate, means for supporting said lens and plate such that the position of one of the principal points and the axis of said lens with reference to the plate corresponds to that which existed at the time the plate was exposed, and means for effecting position adjustments of said lens and plate while said relative position of objective and plate is maintained.

74. Projection apparatus for determining spacial configuration, comprising a projection camera in which lens and plate are maintained in fixed relationship, and means for supporting three optical registration points in any desired geometrical relationship, said apparatus being provided with mechanism for permitting angular adjustments between the photograph to be projected and the three located registration points, said mechanism being so arranged that the said angular adjustments may be made independently about a plurality of axes intersecting in one of the three located registration points, said apparatus being also provided with mechanism for permitting angular adjustment between the photograph and the said three registration points about a plurality of axes intersecting in the external principal points of the lens, and said apparatus being further provided with mechanism for altering the distance between the points of intersection of the two said systems of axes.

75. Means of the character described for use with a picture requiring correction, comprising the combination of an optical element and an image recording element intended to be brought into line with said picture, a a mount adjustably supporting one of said elements whereby it is adapted for linear movement toward and away from the other, and a mount for the other of said elements adapted to permit of effecting its turning movement about at least two intersecting axes.

76. Means of the character described for use with a picture requiring correction, comprising the combination of an optical element and a flat image recording element intended to be brought into line with said picture, a mount adjustably supporting one of said elements whereby it is adapted for linear movement toward and away from the other, and a mount for the other of said elements adapted to permit of effecting its turning movement about three intersecting axes.

77. A projection apparatus including a lens, a holder for a plate the image of which is to be projected by said lens, a mounting for said holder adapted to be adjusted about three intersecting axes of rotation, an image-receiving element and means for effecting movement toward and away from one another of said image-receiving element and said plate holder, and means for effecting an adjustment about any one of said axes without disturbing the adjustment about the other two of said axes.

78. A projection apparatus including a lens, a holder for a plate the image of which is to be projected by said lens, a mounting for said holder adapted to be adjusted about three intersecting axes of rotation, an image-receiving element and means for effecting movement toward and away from one another of said image-receiving element and said plate holder, such point of intersection being on the main longitudinal axis of the projection apparatus.

79. A projection apparatus including a lens, a holder for a plate the image of which is to be projected by said lens, a mounting for said holder adapted to be rotated about three intersecting axes, an image-receiving element and means for effecting movement toward and away from one another of said image-receiving element and said plate holder, such point of intersection being on the main longitudinal axis of the projection apparatus, and substantially at a principal point of the lens.

80. A projection apparatus including a lens, a holder for a plate the image of which is to be projected by said lens, a mounting for said holder adapted to be adjusted about three intersecting axes of rotation, such point of intersection being substantially at a principal point of the lens.

HEREWARD LESTER COOKE.